(12) United States Patent
Longdale

(10) Patent No.: US 8,727,878 B2
(45) Date of Patent: May 20, 2014

(54) VIDEO GAME CONTROLLER

(75) Inventor: Holly G. Longdale, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 798 days.

(21) Appl. No.: 12/176,192

(22) Filed: Jul. 18, 2008

(65) Prior Publication Data

US 2010/0016077 A1 Jan. 21, 2010

(51) Int. Cl.
*A63F 13/00* (2006.01)

(52) U.S. Cl.
USPC .................................. 463/32; 463/20; 463/33

(58) Field of Classification Search
USPC .......................................................... 463/37
See application file for complete search history.

(56) References Cited

U.S. PATENT DOCUMENTS

| | | | |
|---|---|---|---|
| 7,656,393 B2* | 2/2010 | King et al. | 345/173 |
| 7,903,090 B2* | 3/2011 | Soss et al. | 345/173 |
| 2001/0008848 A1* | 7/2001 | Armstrong | 463/37 |
| 2003/0076302 A1* | 4/2003 | Langstraat | 345/161 |
| 2007/0265082 A1* | 11/2007 | Shimura et al. | 463/37 |
| 2008/0146335 A1* | 6/2008 | Toriyama | 463/37 |
| 2008/0300033 A1* | 12/2008 | Shirakawa et al. | 463/9 |
| 2008/0305873 A1* | 12/2008 | Zheng | 463/37 |

OTHER PUBLICATIONS

Author Unknown, "Bamboo—Features & Benefits," http://www.wacom.com/bambootablet/bamboo_features_benefits.php, 1 page, at least as early as Jul. 18, 2008.

Author Unknown, "Bamboo—Overview," http://www.wacom.com/bambootablet/bamboo.php, 2 pages, at least as early as Jul. 18, 2008.
Author Unknown, "BambooFun—Overview," http://www.wacom.com/bambootablet/bamboofun.php, 3 pages, at least as early as Jul. 18, 2008.
Author Unknown, "BambooFun User's Manual for Windows & Macintosh," 63 pages, at least as early as Jul. 18, 2008.
Author Unknown, "Wacom Generation 2 Tip Sensor," 2 pages, at least as early as Jul. 18, 2008.
Photo Labeled A, 1 page, at least as early as Jul. 18, 2008.
Photo Labeled B, 1 page, at least as early as Jul. 18, 2008.
Photo Labeled C, 1 page, at least as early as Jul. 18, 2008.

* cited by examiner

*Primary Examiner* — Dmitry Suhol
*Assistant Examiner* — Ankit Doshi
(74) *Attorney, Agent, or Firm* — Farjami & Farjami LLP

(57) ABSTRACT

One particular implementation of the present invention may take the form of a video game controller that provides multiple inputs to a video game system. The controller may be compatible with multiple video game systems and may interface with multiple video games. More particularly, the controller may include a flat tablet-like device and a stylus that allows the user to draw within the video game environment. The tablet may recognize pressure applied by the stylus or by the user's fingers to map the position of the pressure applied and provide that information to a video game console such that the user may interact with a video game. Other embodiments may include a series of overlays that cover the controller device. The overlay may be specific to a particular video game and provide the user with a interface to press certain areas on the tablet to interact with the video game correctly. The overlay may also allow the user to interact with a pre-existing video game system through the controller.

19 Claims, 17 Drawing Sheets

VIDEO GAME CONTROLLER

FIELD OF THE INVENTION

Aspects of the present invention relate to video games. More particularly, aspects of the present invention involve a method for manipulation of gameplay mechanics by the video game user during game play. Aspects of the present invention further involve a video game controller that may provide several inputs to a video game system to facilitate the manipulation of gameplay mechanics.

BACKGROUND

In-home video games and video game systems are common place in today's market. Such systems allow a user to play video games at home on a standard television set or on a handheld device that the user may carry with him. Typically, in-home video game systems include a console that reads the video game code from a storage device (i.e. a CD-ROM disc or cartridge) and transmits the video to a television screen for display. Video game systems also typically include a controller device that allows a player of the video game to provide inputs to the video game to manipulate the characters, racecars, or other features of the game.

Generally, the designer of the video game will create a computer-rendered world in which the video game characters, racecars, or other features may interact. For example, many video games allow a video game user to maneuver a sprite or character through a computer-rendered world to accomplish a set of tasks. Other video games allow the user to control a vehicle or airplane through a computer-rendered world. In two-dimensional video games, the characters may move in two dimensions, up and down on the screen or left and right. In three-dimensional video games, the characters are typically allowed to move in three directions. However, while the video game user is allowed to maneuver the characters through the computer-generated worlds, such worlds are typically finite, limiting the character's interactions within the pre-designed video game environment. For example, a character may be controlled by the video game user to travel through a maze. However, the video game character is typically constrained within the walls of the maze. Thus, the character is limited in movement to the pre-designed existing video game environment of the maze.

SUMMARY

As shown above, video games do not typically allow the user to manipulate the environment of a video game. Instead, a user of a video game is limited to manipulating the characters of the game through a pre-designed, computer-rendered environment. Thus, what is needed is a method and apparatus that allows the user to select and manipulate the gameplay mechanic and environment of a video game during the game play. What is also needed is a video game controller that provides a tablet input device to facilitate the manipulation the game play mechanic.

One embodiment of a video game controller may include a tablet pad that includes a surface that detects pressure applied to the tablet pad by a user. The controller may also include a stylus device configured to be used by the user to provide pressure to the tablet pad and at least one accelerometer configured to measure the movement and orientation of the video game controller. The controller may further include a microprocessor in communication with the tablet pad and the at least one accelerometer with the microprocessor configured to associate a coordinate value to the pressure applied to the tablet pad by the user. Finally, the controller may include a port in communication with the microprocessor, the port configured to communicate with a video game system and wherein the microprocessor transmits the coordinate value to the video game system through the port.

A second embodiment of a video game controller may include a tablet pad including a surface that detects pressure applied to the tablet pad by a user. The controller may also include a microprocessor in communication with the tablet pad, with the microprocessor configured to associate a coordinate value to the pressure applied to the tablet pad by the user. The controller may further include a port in communication with the microprocessor, the port configured to communicate with a video game system and wherein the microprocessor transmits the coordinate value to the video game system through the port. Finally, the controller may include an overlay positioned at least partially on the surface, wherein the overlay indicates to the user where to apply pressure to the tablet pad to interact with a video game.

A third embodiment may include a system for communicating a user input, including a tablet pad that includes a surface that detects pressure applied to the tablet pad by a user. The system may also include a stylus device configured to be used by the user to provide pressure to the tablet pad and at least one accelerometer configured to measure the movement and orientation of the system. The system may further include a microprocessor in communication with the tablet pad and the at least one accelerometer with the microprocessor configured to associate a coordinate value to the pressure applied to the tablet pad by the user. Finally, the system may include a port in communication with the microprocessor, the port configured to communicate with a video game system and wherein the microprocessor transmits the coordinate value to the video game system through the port.

DETAILED DESCRIPTION

One particular implementation of the present invention may take the form of a method for allowing a user of a video game to alter game scenes, objects and models in real-time by drawing shapes within the video game environment during game play. The method may include programmatic reactions by the gameplay mechanics to the user-selected alterations to the video game as the alterations are made. Further, the method may include game space, background, coloring, shading, pace or other alterations to the video game environment in response to the alteration of the game space.

More particularly, one method for manipulating a video game may allow the user to alter the game space by using a drawing tool to draw shapes within the video game environment. The video game may recognize the shape drawn within the game and generate a rendered shape corresponding to the drawn shape. The video game and characters within the video game may also react to the rendered shape in real time. In this manner, the user or player may manipulate the environment of the video game by drawing shapes within the game space, thereby changing the video game environment and the reactions of the characters of the game. A second method may allow the player to alter character models or sprites within the video game to stretch or shrink the model. Programmatic characteristics of the video game characters may react accordingly. A third method may allow the player to create new action options within the video game by drawing shapes within the video game environment and on the video game characters. The characters and sprites of the video game may react to the new actions accordingly. The above methods may occur within a two-dimensional or three-dimensional video game environment.

Figure 1:
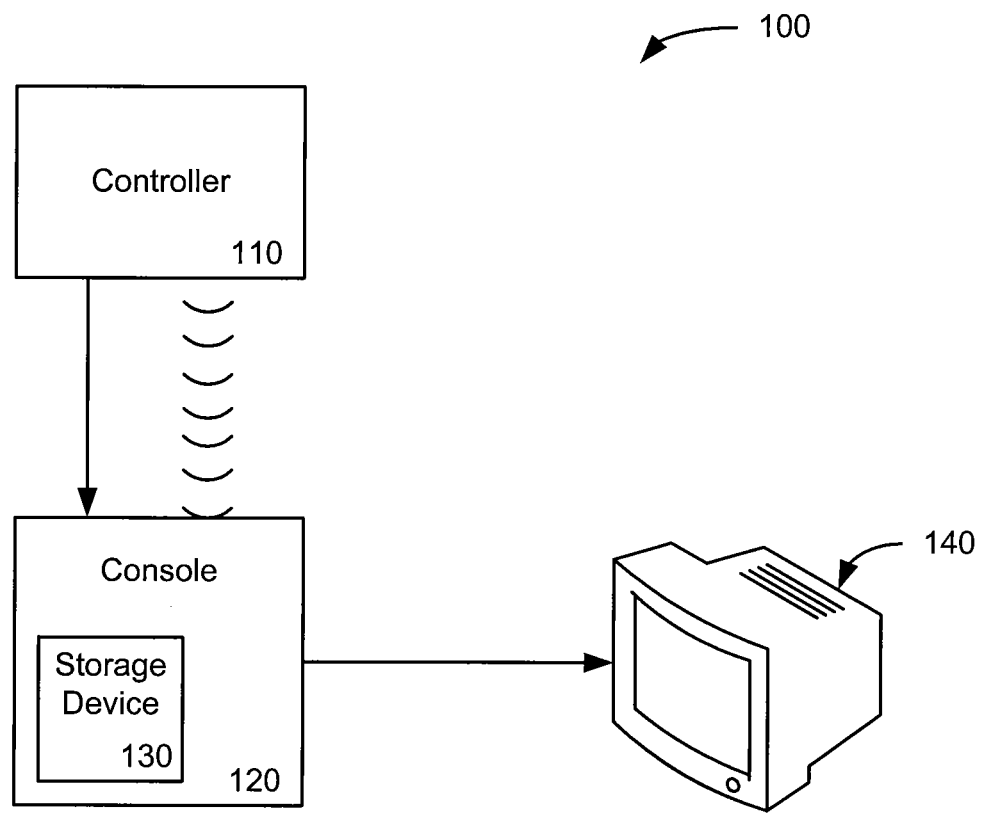
FIG. 1 is a block diagram illustrating a video game system configured in accordance with aspects of the present disclosure.

FIG. 1 is a block diagram illustrating a video game system configured in accordance with aspects of the present disclosure. The video game system 100 may include a controller 110, a console 120, a storage device 130, and a display device 140. It should be noted that the video game system depicted in FIG. 1 is illustrative only. Alternative embodiments of a video game system may add components, omit components, or may change the configuration of the in which the components are connected.

Video game system 100 is one example of a platform for running a video game configured in accordance with the present disclosure. Such a video game system 100, however, may be played on any platform that provides a user-interaction with a video game, including in-home video game consoles that attach to a television, personal computers, handheld video game consoles, mobile phones, personal digital assistants, music or audio players, and so on. Accordingly, a "video game system" as used herein, encompasses all such devices and any other device that allows a user to interact and play a video game, configured as set forth herein.

A video game system may include a controller device 110 or several controller devices. A controller 110 of a video game system may allow a user or player to provide inputs to the video game system to control the various characters and features of the video game. The controller may connect to a video game console 120 by plugging the controller 110 directly into the console 120 or the controller 110 may connect wirelessly. Further, in video game systems that are handheld, the controller may be built directly into the console device. The controller device 100 to the video game system may include, but is not limited to, a controller containing a directional pad and a series of buttons, a joystick, a tablet device, a mouse, a keyboard, a device taking the shape of a separate input device with a series of buttons (i.e. a drum, a guitar, a dance pad), a stylus, and so on. Accordingly, a "controller" as used herein, encompasses all such devices that allows a user to provide an input to the video game system so that the user may interact with the video game. Several embodiments of controllers are described in more detail below with respect to FIGS. 11-16.

The video game console 120 may provide many functions for the video game system. The console 120 may accept and interpret the inputs being provided by the user through the video game controller 110. The console 120 may also provide the display output to a display device 140. Further, the console 120 may accept and interpret the video game code from a storage device 130 in which the code may be stored. In this manner, the console 120 may be similar in design and functionality as a typical home computing system. Accordingly, a "console" as used herein, encompasses all such devices that may provide a platform through which a user of the video game system may interact and play a video game.

The video game code may be written in any computer-readable medium and stored on any computer-readable storage device 130, including optical disks, flash media, floppy disks, hard drives and so on. The video game code may be read by the console from the storage device 130 during game play to provide the computer-generated environment in which the players interact. Further, many varied types of video games may support the present embodiment. Such games include first-person games, side-scrolling games, sports-related games, role-playing games, action games, strategy games, casino games, and so on. Accordingly, a "video game" as used herein, encompasses all such games and any other video games that may be played on a video game system.

The video game system 100 may also include a display device 140. For in-home video game systems, the display device 140 is typically a television, including CRT, plasma, and LCD televisions. For handheld video game systems, the display device 140 is typically embodied within the handheld device and may include plasma and LCD-type screens. For video game systems embodied in a personal computer, the display device 140 is typically a monitor connected to the personal computer. Accordingly, a "display device" as used herein, encompasses all such display devices that provides a visual representation of the video game.

Figure 2:
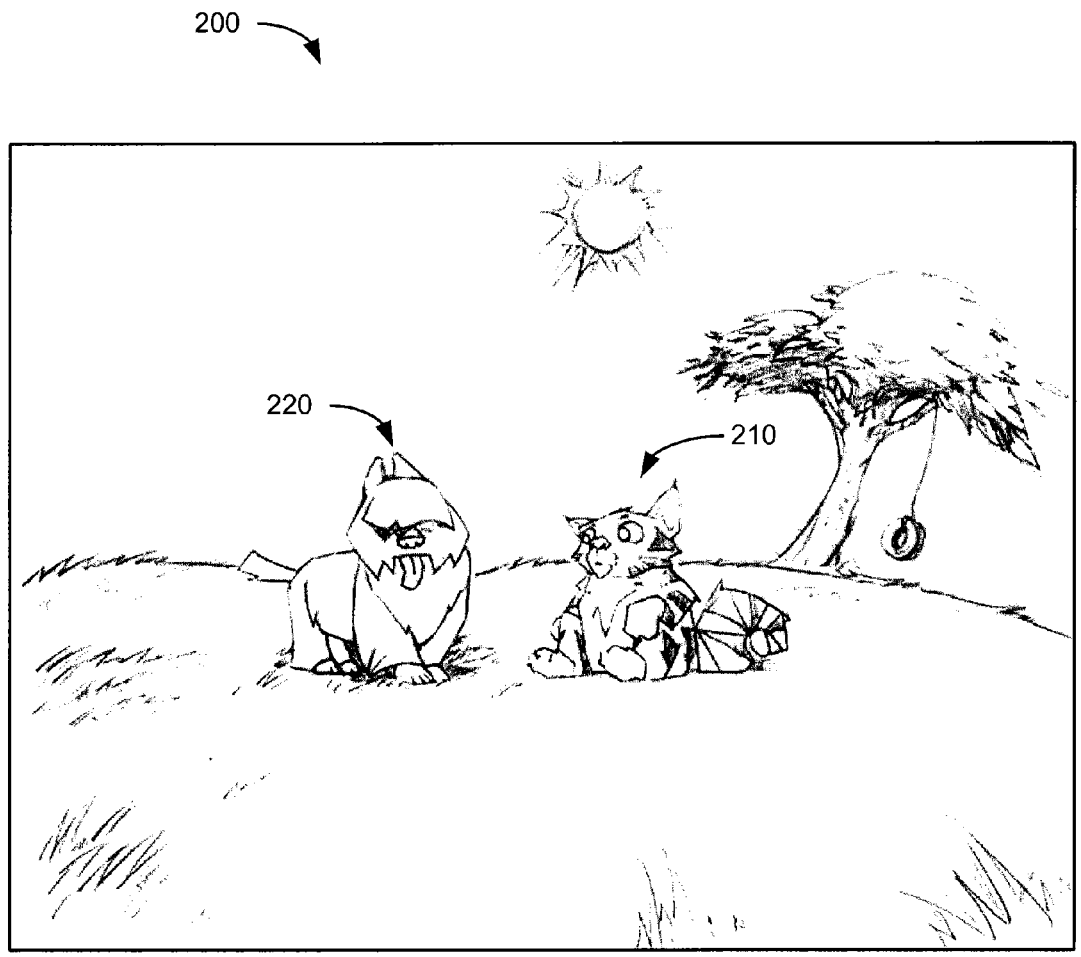
FIG. 2 is one example of a video game environment with the capabilities of a first embodiment.

FIG. 2 is one example of a video game environment with the capabilities of a first embodiment. The video game 200 may include one or more characters. For example, the video game 200 depicted in FIG. 2 includes a cat character 210 and a dog character 220. One or both of the characters may be controlled by the video game user through a video game controller. Further, one or both of the characters may move independent of the user's input, normally through the video games programmatic characteristics of the characters. Those skilled in the art will appreciate the many ways a video game may control the characters embodied in the video game environment, either through programmed characteristics of the characters or through a user input.

Figure 3:
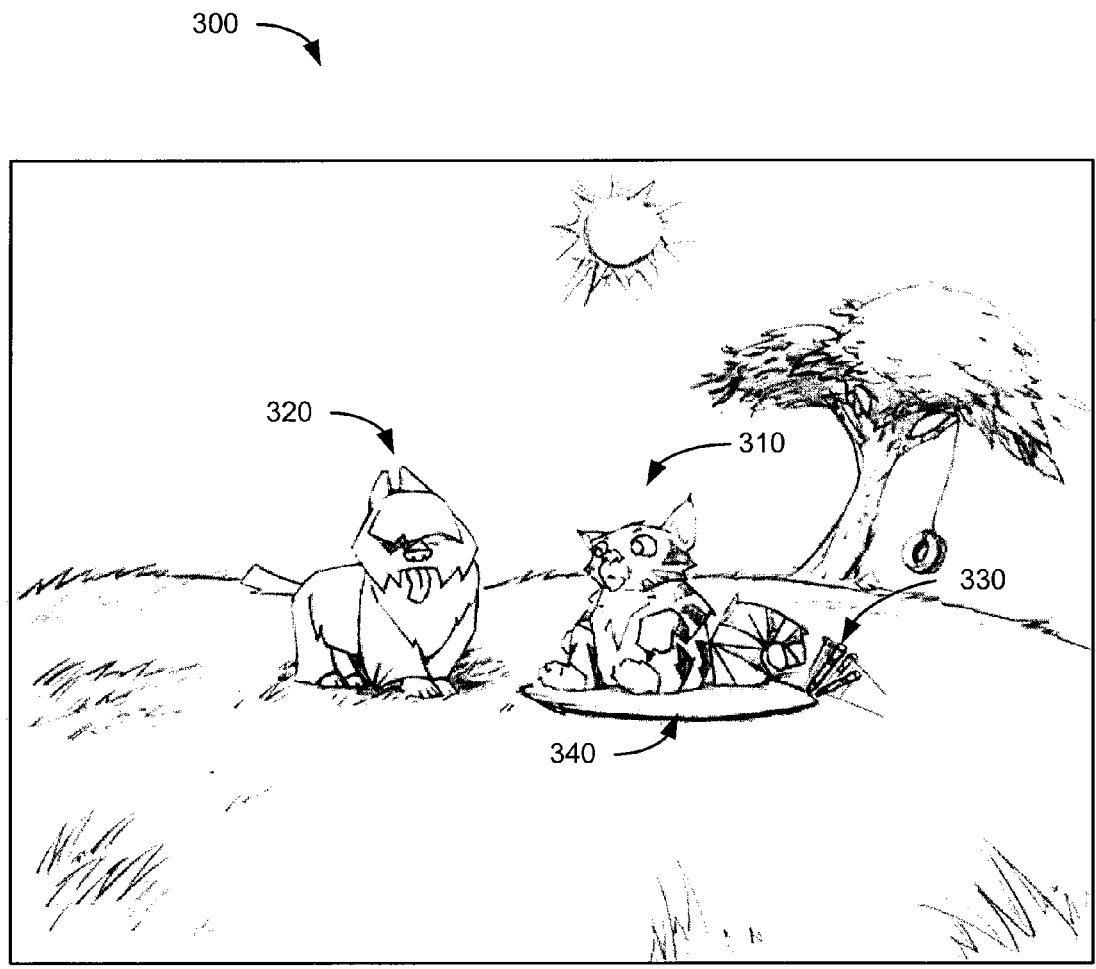
FIG. 3 is an example of a video game with the capabilities of the first embodiment illustrating using a drawing device to alter the game space by drawing a shape within the video game environment.

FIG. 3 is an example of a video game with the capabilities of the first embodiment illustrating using a drawing device to alter the game space by drawing a shape within the video game environment. FIG. 3 depicts a similar example of a video game as that depicted in FIG. 2 and includes the same characters and video game environment. However, FIG. 3 further depicts a user of the video game altering the game environment by drawing a shape within the video game and, hence, adding a new feature to the video game environment to interact with the characters.

As shown in FIG. 3, the video game 300 may include a user-controlled icon or drawing device 330 that may be used for drawing shapes and lines within the video game environment. The drawing device 330 may be used by the player to draw shapes within the video game environment to ultimately create rendered shapes that the video game characters may then interact with. In FIG. 3, the drawing device 330 icon is a pencil. However, the drawing device 330 icon may take any shape. For example, the drawing device 330 icon may take the shape of an arrow, similar to the pointer of a typical computer mouse.

The drawing device 330 may be controlled by the user through a video game controller. For example, the user may move a mouse controller of a typical computer system to move the drawing device 330 around the video game environment. The user may then depress and hold a button located on the mouse to activate the drawing feature of the video game. The video game system may interpret the button pushing and movement of the mouse controller as an indication that the user is drawing in the video game environment. Thus, a line may be drawn within the video game as the mouse moves while the button on the mouse is being pressed. In this manner, the user may draw a shape within the environment of the video game.

An alternative operation to control the drawing device 330 within the video game environment may include the user maneuvering the drawing device icon using a directional pad of a video game controller. The controller may also include buttons that may be pressed by the user to indicate that drawing is to begin. Through the directional pad and buttons of the controller, the user may draw a variety of shapes within the video game environment.

Another operation to control the drawing device 330 within a video game environment may be accomplished through a tablet input to the video game system. The tablet may include a stylus-type device that interfaces with a flat panel of the device. The user may use the stylus to draw shapes on the flat panel of the device. The tablet may then interpret the shape drawn on the flat panel and draw a corresponding shape within the video game environment. Thus, the tablet may provide the user with the feeling of drawing with the stylus directly within the video game environment. Several embodiments of a tablet-type video game controller are described in more detail below with respect to FIGS. 11-16.

While several examples of methods to manipulate a drawing icon within a video game are presented, any input device recognized by the video game system may be used to draw shapes within the video game.

The user may draw a circular shape within the environment of the video game using the drawing device 330. In the example of FIG. 3, a user may draw a circle 340 under the cat character 310 in the video game environment. As explained above, the video game may draw a line that follows the drawing device 330 as the user draws within the video game using the video game controller. In this manner, the user may draw the shape of a circle 340 under the cat character 310. Once the user of the video game completes the shape, the drawn shape may then be used by the video game to manipulate the video game environment and gameplay in reaction to the drawn shape as depicted in FIG. 4.

Figure 4:
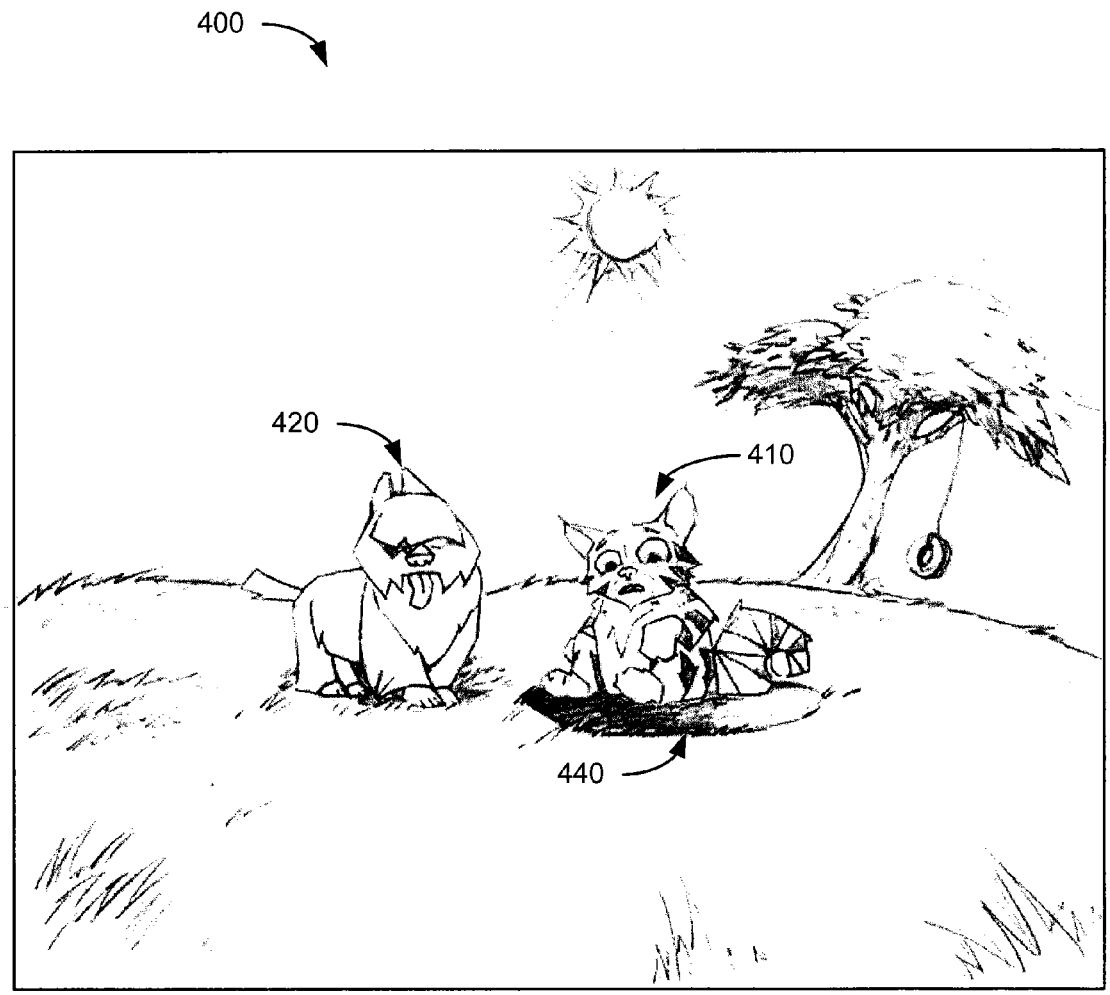
FIG. 4 is an example of a video game with the capabilities of the first embodiment illustrating the video game substituting a rendered shape in place of a drawn shape within the video game environment.

FIG. 4 is an example of a video game with the capabilities of the first embodiment illustrating the video game substituting a rendered shape in place of a drawn shape within the video game environment. FIG. 4 depicts a similar example of a video game as that depicted in FIGS. 2 and 3 and includes the same characters and video game environment. However, FIG. 4 further depicts the addition of a rendered object within the video game environment replacing a shape drawn by the video game user.

As discussed above with reference to FIG. 3, a user of a video game 300 may draw a shape within the video game environment using a drawing device 330 within the game. After the user draws a shape within the video game environment, the video game 400 may interpret the drawn shape and provide the user with a rendered shape more closely matching the detailed computer-rendered environment of the game, as shown in FIG. 4. For example, the video game 400 may recognize the circle drawn under the cat character 410 in the video game as a hole in the ground. The video game may then replace the drawn shape with a rendered hole in the ground 440 below the cat character 410 in the video game environment. The operation of replacing a drawn shape with a rendered shape is described in more detail below with respect to FIG. 10. Further, as described below with reference to FIG. 5, once the rendered shape is inserted within the video game environment, the characters of the video game may interact with the newly rendered shape.

Figure 5:
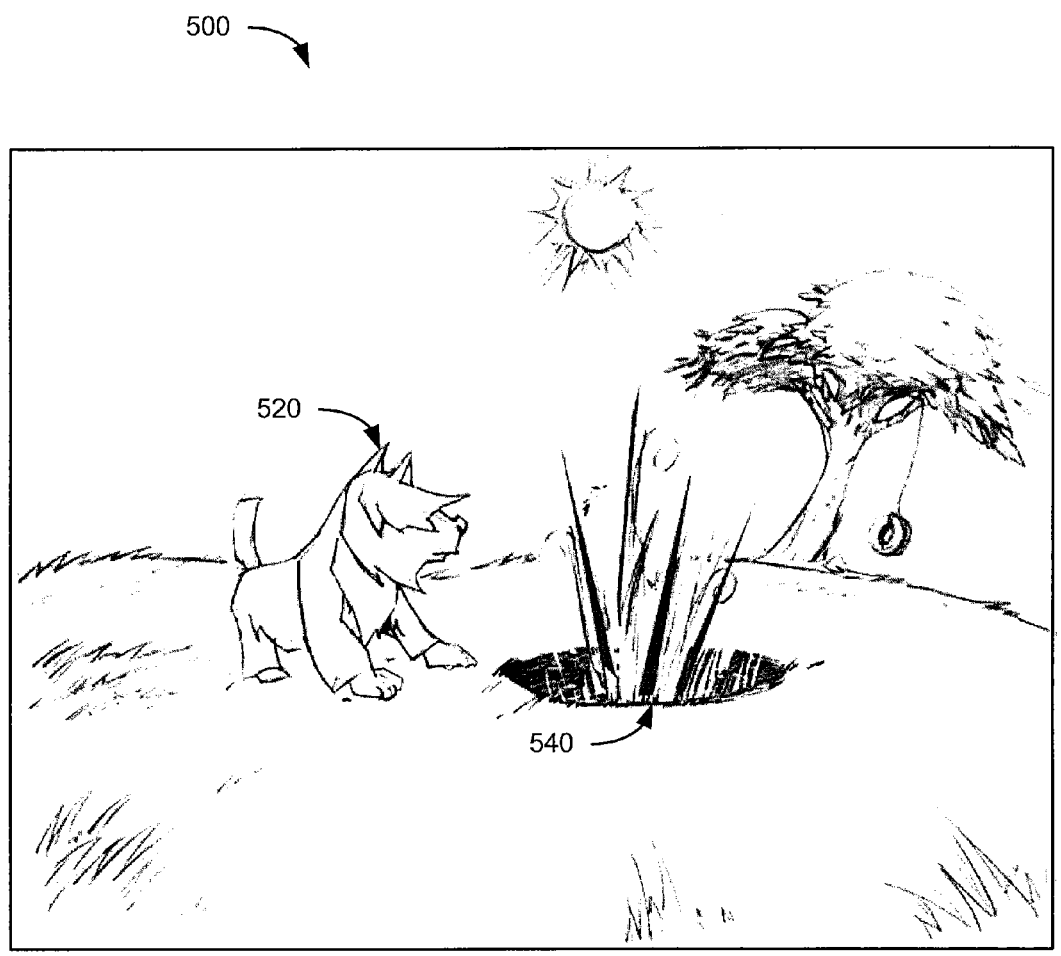
FIG. 5 is an example of a video game with the capabilities of the first embodiment illustrating the characters of a video game interacting with a computer-rendered shape that replaces a drawn shape within the video game environment.

FIG. 5 is an example of a video game with the capabilities of the first embodiment illustrating the characters of a video game interacting with a computer-rendered shape that replaces a drawn shape within the video game environment. FIG. 5 depicts a similar example of a video game as depicted in FIGS. 2-4 and includes the same characters and video game environment. However, FIG. 5 further depicts the characters of the video game interacting with the newly drawn and rendered shape within the video game environment.

As depicted in FIGS. 2-4, a user may draw a shape within a video game environment that the video game may then interpret replace with a computer-rendered shape that more closely matches the detailed environment of the video game. As depicted in FIG. 5, once the rendered shape is inserted into the video game environment, the characters may interact with the rendered shape. For example, once the hole under the cat character is drawn into the video game 500 and rendered as a hole in the ground 540, the cat may then fall into the hole. Further, the dog character 520 may react to the cat falling into the hole 540 by looking at the hole 540. In other examples, the character's programmatic behaviors may cause the character of the video game to act differently in response to the newly rendered object. For example, a wall may be drawn within a video game to stop the oncoming rush of a villain. Once the drawn shape is recognized by the video game and a rendered wall is inserted into the video game environment to replace the drawn shape, the villain character may stop and study the wall. The villain character may then attempt to climb over the wall or attempt to find a an alternate way around the wall to continue the pursuit. Alternatively, if the wall is never drawn into the environment by the user, the villain may continue in his pursuit, unabated. In this manner, the characters of a video game may interact with a newly rendered shape within the video game environment. Further, a character's programmatic behavior within the video game may also cause the character to conduct a series of movements in reaction to the newly rendered shape. These series of movements may be different from the movements of the character if the rendered shape is not drawn in the video game environment. Those skilled in the art will appreciate all of the varied ways in which a video game character may respond to a newly rendered shape within the video game environment, and the example interactions set out herein are merely a discrete sample of the myriad possible shapes and associated interactions.

Figure 6:
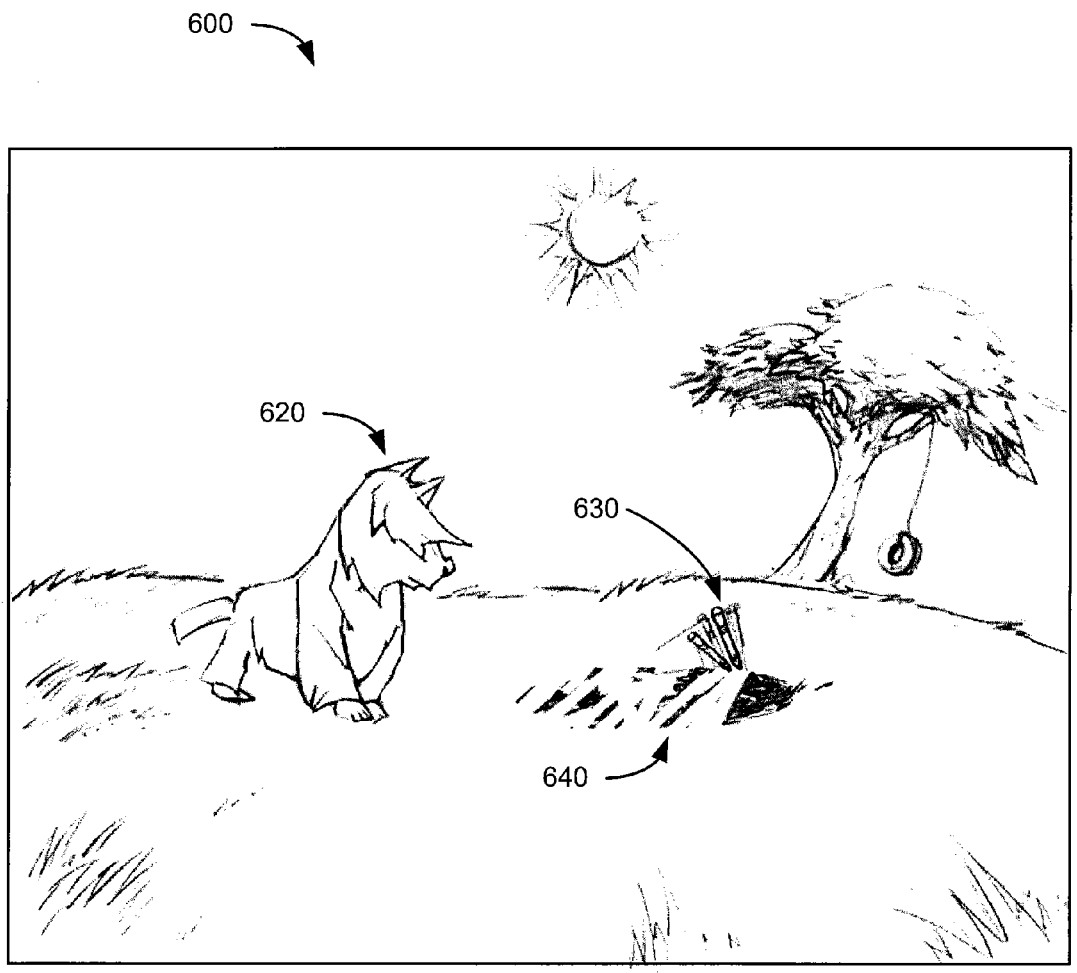
FIG. 6 is an example of a video game with the capabilities of a second embodiment illustrating altering the game space through the removal of rendered shapes or objects within a video game environment.

FIG. 6 is an example of a video game with the capabilities of a second embodiment illustrating altering the game space through the removal of rendered shapes or objects within a video game environment. FIG. 6 depicts a similar example as that depicted in FIGS. 2-5 and includes similar characters and video game environment. However, FIG. 6 further depicts the capability of the user to erase or remove a shape that has been drawn into the video game environment by the user. It is also possible for the user to erase or remove a rendered shape that has replaced the drawn shape.

As shown in FIGS. 2-5, a circular shape may be drawn within a video game environment and replaced with a rendered shape the characters within the video game may react and interact with. As shown in FIG. 6, the user may also remove or erase an existing or rendered shape. For example, the user may use a drawing device 630 within the video game to draw over the rendered shape. The drawing device 630 of may be similar to the drawing device 330 described in FIG. 3. Alternatively, the user may select an erase function from a menu rather than a drawing function. Then, by moving the drawing device 630 over the rendered object 640, the object may be erased from the environment. Similarly, the user may press a button on the video game controller while moving the drawing device 630 over a rendered object to erase the object. Those skilled in the art will recognize the many various ways in which a user of a video game may interact with the drawing device to erase rendered objects within the video game.

Similar to the drawing function described above, the characters within the video game may also react to the erasing function. For example, the dog character 620 in FIG. 6 may turn towards the erasing function as the rendered shape is removed from the environment. Also similar to the drawing function, the programmatic behavior of the characters may also recognize the erased object and act accordingly. For example, after the hole 640 is removed, the dog character 620 may know that it is capable of walking over the spot where the hole was without falling in. Similarly, a villain character may recognize that a wall previously blocking the villain's path may have been erased. The villain character may then walk down the previously blocked path.

While the above descriptions demonstrate the drawing and erasing function in relation to the environment of the video game, the same functions may also be applied to the characters themselves. For example, a user may use the remove function as described above to erase the arm of a character within the video game. The characters of the video game may also react accordingly in response to the erased arm. Thus, a character with an erased arm may search for an object located in the video game environment to replace the erased arm. Further, the video game user may draw a replacement shape on the arm of the character after erasing the arm. For example, the user may draw a feather duster on the character of the video game. Once the drawn shape is recognized and rendered in a similar manner as described above, the character may then react accordingly and begin using the feather duster arm. As described below with reference to FIG. 10, the number of possible shapes and objects that may be recognized by the video game is limited only by the imagination of the video game designer and the available memory space of the video game system.

Figure 7:
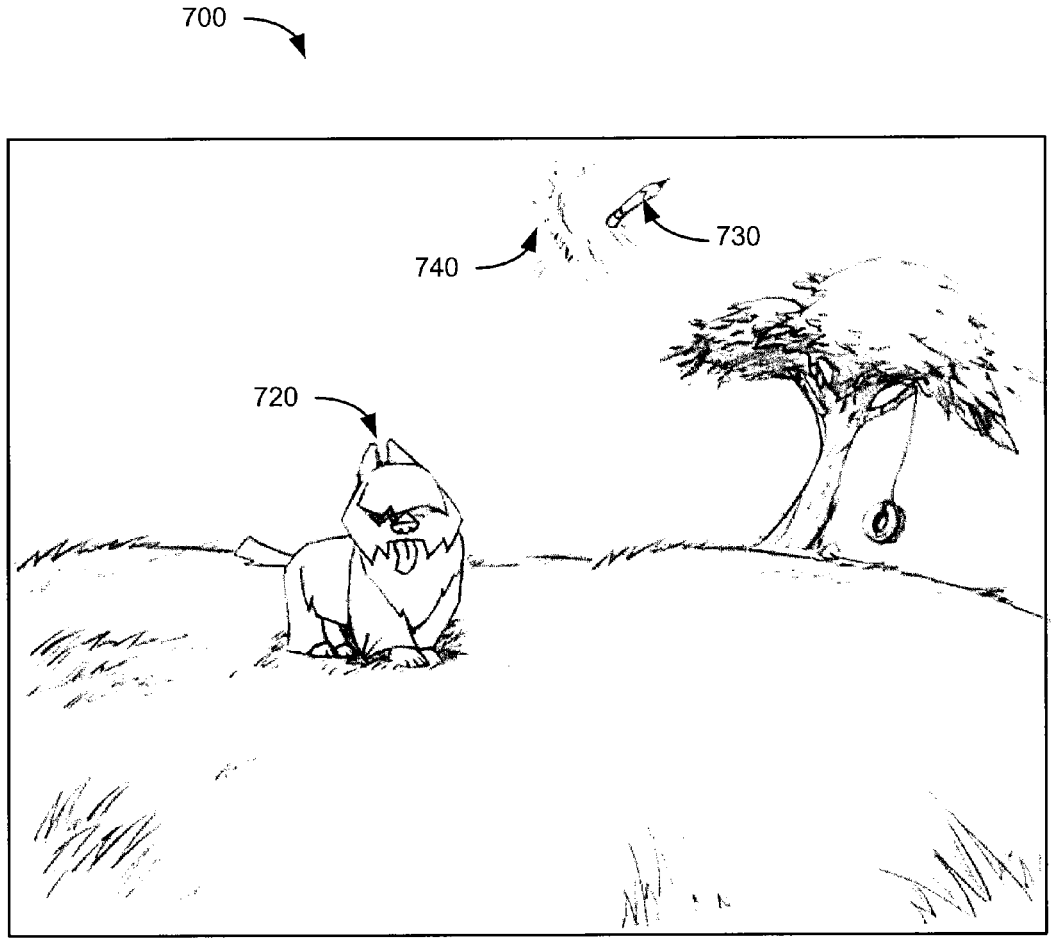
FIG. 7 is an example of a video game with the capabilities of a third embodiment illustrating altering the game space by removing an existing feature from the background of a video game environment.

The drawing and removing functions described above may also occur on the background environment of the video game, independent of the characters. FIG. 7 is an example of a video game with the capabilities of a third embodiment illustrating altering the game space by removing an existing feature from the background of a video game environment. FIG. 7 depicts a similar example as that depicted in FIGS. 2-6. However, FIG. 7 further depicts the capability of the user to erase or remove a object that is part of the video game background environment.

A drawing device 730 may be used to allow the user to interact with the video game background environment. More specifically, the drawing device 730 may allow the user to add and remove objects within the video game background environment. For example, the drawing device 730 may be utilized by the user to erase a sun object 740 located in the sky of the video game environment. The erase function may be performed in a similar manner as described with respect to FIG. 6. While the video game may be designed to allow the user to erase any object associated with the background environment of the video game, it is likely that some background objects will be static and cannot be erased by the user. The types and numbers of background objects that may be erased by the user may be decided by the video game designer.

The erasing of an object of the background environment in the video game 700 may cause the overall environment of the video game to change. For example, a user of a video game may erase a window of a room in the background of the video game environment. After erasing the window, the video game may alter the background of the environment to change the temperature of the room, i.e. by providing icicles on the window ledge. Further, the characters may react to the erasing of the object in the background environment of the video game. Environment and character interaction with the erased object may be similar to the reactions as described above.

Figure 8:
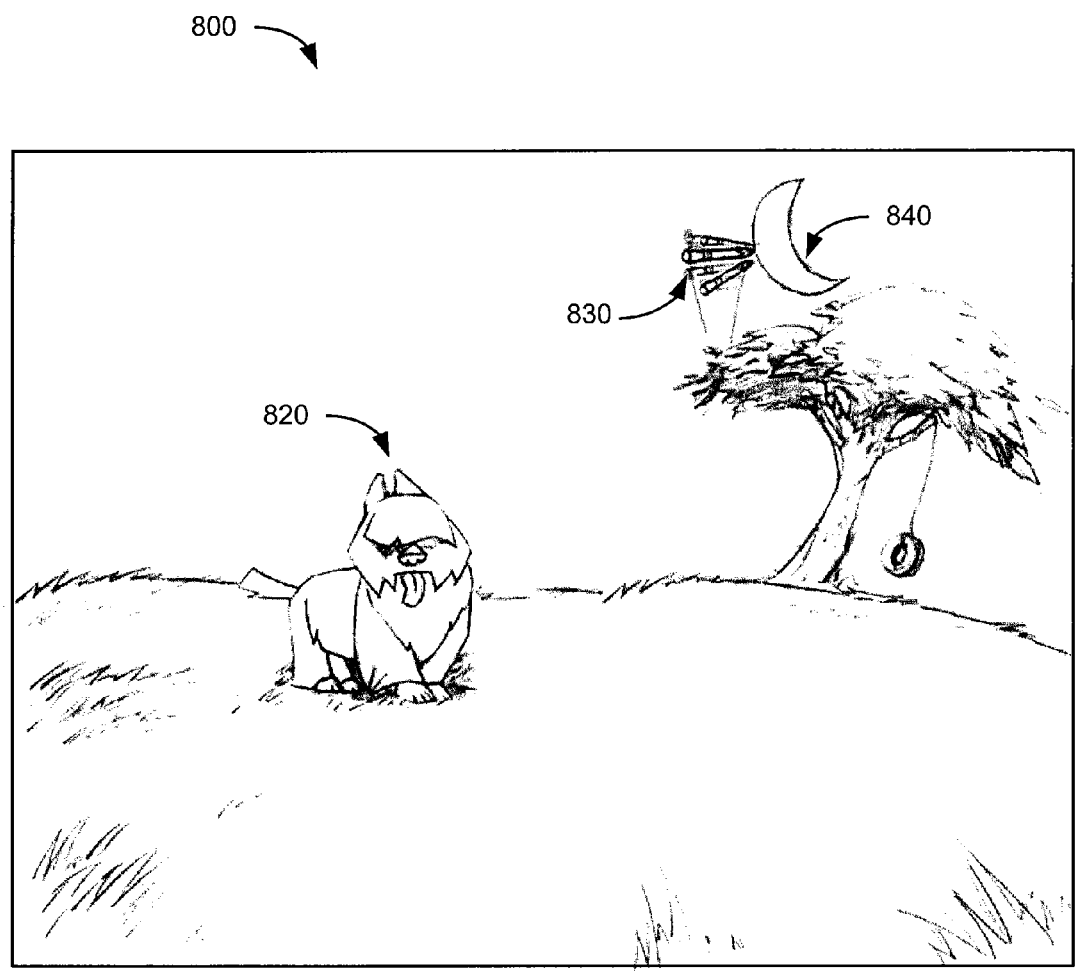
FIG. 8 is an example of a video game with the capabilities of a fourth embodiment illustrating altering the game space by drawing an object within a video game background environment.

Similar to the erase function of the background objects, a user may also draw objects into the background environment of the video game. FIG. 8 is an example of a video game with the capabilities of a fourth embodiment illustrating altering the game space by drawing an object within a video game background environment. FIG. 8 depicts a similar example as that depicted in FIGS. 2-7.

As shown in FIG. 8, a user of a video game 800 may use a drawing device 830 to draw a shape within the background environment of a video game. For example, the user may use the drawing device 830 to draw a crescent moon shape 840 in the sky of the video game environment. The user may draw a shape within the background environment of a video game in a similar manner as described above with reference to FIG. 3, namely by utilizing a drawing device 830 and manipulating a video game controller.

Similar to FIG. 4 above, the shape drawn in FIG. 8 may be interpreted by the video game 800 and compared to a list of available rendered objects. The operation of replacing a drawn shape with a rendered shape is described in more detail below with respect to FIG. 10.

Figure 9:
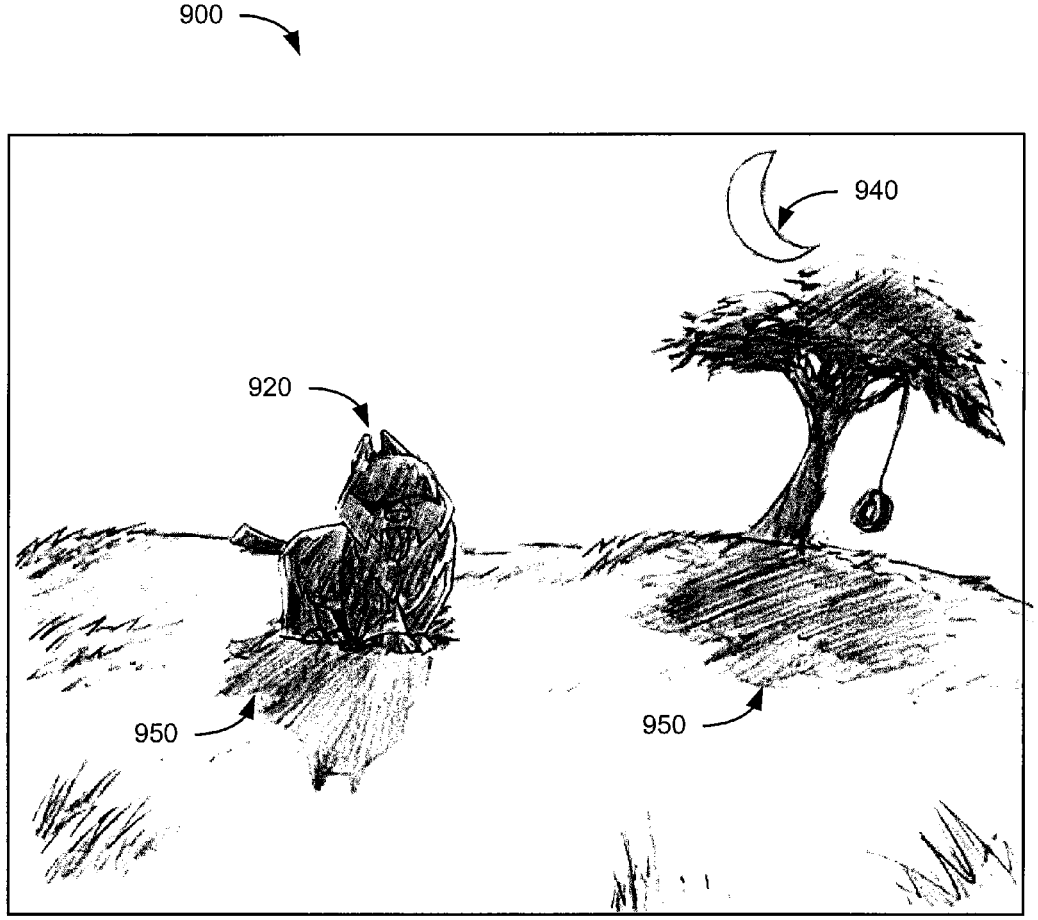
FIG. 9 is an example of a video game with the capabilities of the fourth embodiment illustrating the video game inserting a rendered shape in place of the drawn object within the background environment of a video game, and altering the game space environment based on a characteristic of the rendered shape.

FIG. 9 is an example of a video game with the capabilities of the fourth embodiment illustrating the video game inserting a rendered shape in place of the drawn object within the background environment of a video game, and altering the game space environment based on a characteristic of the rendered shape. FIG. 9 depicts a similar example as that depicted in FIGS. 2-8 and includes the same character and video game environment. However, FIG. 9 further depicts the addition of a rendered object to the video game background environment through the drawn shape.

The video game 900 in FIG. 9 may recognize the shape drawn by the user in the background of the video game environment and replace the drawn shape with a rendered shape that more closely matches the computer-rendered details of the video game environment. For example, the video game may recognize the crescent moon shape 940 drawn in FIG. 9 and insert a rendered moon 940 into the sky of the video game environment. The process of replacing a drawn shape with a rendered shape is described in more detail below with respect to FIG. 10.

The video game may interpret the insertion of the rendered shape into the video game environment and adjust the environment accordingly. For example, the video game may replace the drawn crescent moon 940 with a rendered crescent moon 940. Further, the video game may recognize that the crescent moon shape 940 symbolizes night and may alter the environment of the video game to represent night. Thus, the video game may perform a shading 950 of the video game environment to darken the background, creating the sense of night time within the video game. Therefore, not only may the characters interact and react to the newly drawn and rendered shape in the background environment, the entire video game environment may also be adjusted accordingly.

Another embodiment may allow the user to stretch or otherwise manipulate the characters within the video game through the use of push/pull points on the character sprite or model. For example, the characters of the video game may include a series of push/pull points indicated on the character, such as flashing stars or glowing dots. These push/pull points may be manipulated by the video game user to alter the character model. Thus, a user may utilize the video game controller to move the drawing device to select one of the push/pull points on the video game character. The user may then use the video game controller to move the push/pull point to stretch, compact, or otherwise manipulate the character's shape. Examples of possible character manipulation include, but are not limited to, stretching or shortening the limbs of the character, making the character wider or thinner, and increasing the width of any limb of the character to represent additional strength.

Further, the manipulation of the character models may cause the characters to react accordingly. For example, the user may contract the legs of a villain within the video game. The video game may recognize the alteration in the character's model and programmatically alter the behavior of the character. Thus, the villain may recognize that his legs are shorter and may begin to use his arms to propel himself forward. Another example may allow the video game to recognize the increase in strength of a character to allow the character to break a wall that was previously impenetrable. Those skilled in the art will recognize the various ways that the video game may recognize and react programmatically to the altered character models.

Similarly, an embodiment may allow the user to stretch or otherwise manipulate the various features of the environment of the video game. This alteration of the video game environment may be accomplished through push/pull points located within the environment in a similar manner as described above for the alteration of the video game characters. For example, a push/pull point may be indicated on a hill of the video game environment. The user may use the video game controller and the drawing device to select the push/pull point to stretch or extend the hill, thereby making the hill taller or steeper. Similar push/pull points may be used to make a valley deeper and/or wider, a lake larger, a cave or tree taller. The alteration of the environment through the use of a push/pull point may include any feature of the video game environment. Further, the characters of the video game may recognize and react to the altered environment in a similar manner as described above.

In another embodiment, the video game may provide a series of environmental tools that may be selected to replace the drawing tool and allow the user to alter the environment of the video game. The user of the video game may select one of the environmental tools from the set of tools for a specific alteration to the environment. For example, a depression tool may be selected by the user to temporarily replace the drawing device. The depression tool may allow the user to create a depression in the ground of the video game environment by selecting or otherwise indicating the placement of the depression within the video game environment. Once the location of the depression within the video game environment is indicated, a depression may appear. Similarly, an erosion environmental tool may be selected for use by the user. The erosion tool may allow the user to thin or erode aspects of the video game environment. For example, a rock may be located on a hill within the video game environment. The user may use the erosion tool to select or otherwise indicate the area below the rock for erosion. The video game may respond to the selection of the area below the rock by thinning or eroding that aspect of the video game environment. Further, the characters and environment of the video may recognize and react to the altered environment. For example, the rock within the video game may recognize and react to the erosion of the ground below the rock by rolling down the hill in response to the video game gravity. Those skilled in the art will recognize the various environmental tools that may be included in the video game to alter the video game environment.

Figure 10A:
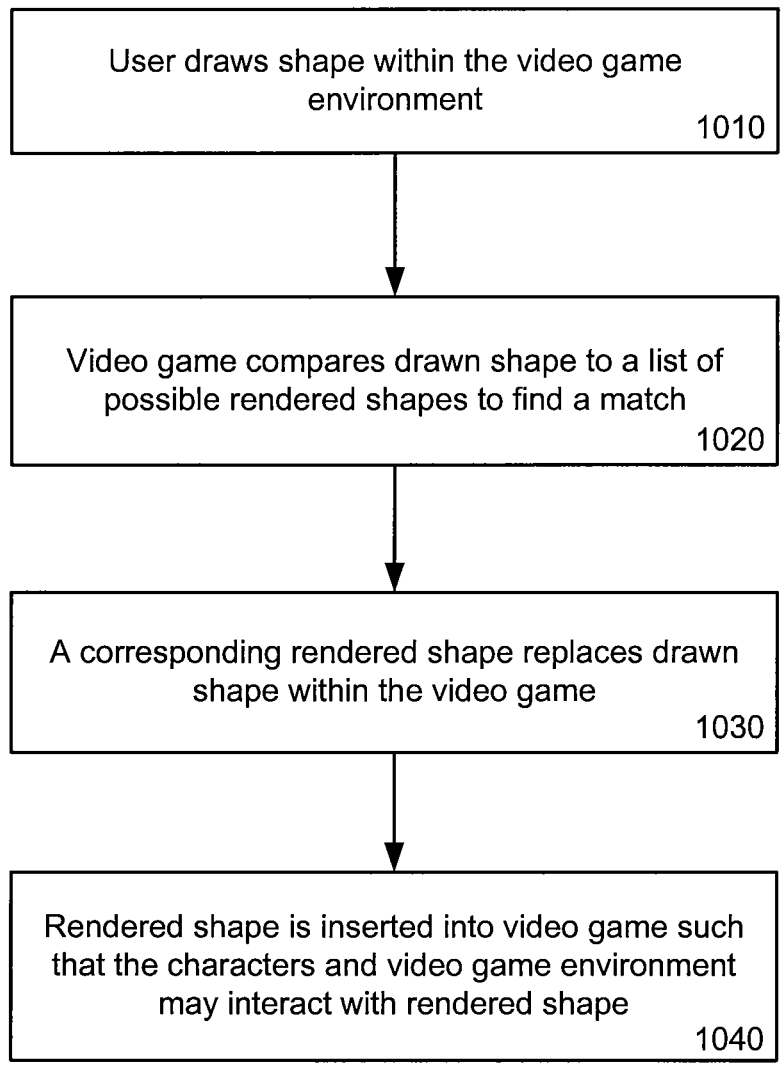
FIG. 10a is a flow chart illustrating a method for a video game to recognize a shape drawn within the video game environment, replace the drawn shape with a rendered shape, and allow interaction with the rendered shape.

FIG. 10a is a flow chart illustrating a method for a video game to recognize a shape drawn within the video game environment, replace the drawn shape with a rendered shape, and allow interaction with the rendered shape. Beginning in operation 1010, the user may draw a shape within the video game environment using the video game controller. The user may draw the shape within the video game in a similar manner as described above with reference to FIGS. 3 and 8.

In operation 1020, the video game may then compare the drawn shape against a list of possible rendered shapes. Software code may be written to create a real-time 3D rendering while the drawings are being made, or the code may interpret a drawing created by a user within a defined margin of error. Each rendered shape in the list of possible rendered shapes may contain a collection of points that define the rendered shape. For example, a user may draw a circle in the video game environment. The code may recognize the circle shape by comparing several points along the drawn shape. These points may be compared to the collection of points of each rendered shape in the list. The code may then recognize that the points of the drawn circle match or closely approximate the collection of points for a rendered hole. Thus, the video game may recognize that the user has drawn a hole in the ground of the video game environment.

If the drawn shape matches or is similar to one of the rendered shapes included in the list of rendered shapes, the video game may replace the drawn shape with the rendered shape in the video game environment in operation 1030. Similar to handwriting software, the code of the video game may compare the drawn shape against a collection of points that define the rendered shape. As long as the rendered shapes are pre-defined with thresholds for margins of error, the drawn shapes ma y be recognized if the they fall within the margins of error. For example, the game software may interpret any shape with three angles within a maximum and minimum threshold (margin of error) as a triangle no matter how imperfect the triangle might be. The triangle shape may hen be coded to create a 3D pyramid object in the video game environment, and the triangle object may be created. In this manner, the drawn shape may be replaced by a rendered shape and the rendered shape may become part of the video game environment so that the video game characters may interact with the newly rendered shape in operation 1040.

The list of computer-rendered shapes available to compare with drawn shapes within the video game environment may contain any number of rendered shapes. For example, the list may include a rendered ball, a collection of balloons, a boxing glove, a ladder, a wall, etc. Any number of items or shapes may be included in the list of rendered shapes that may replace the drawn shapes. Further, the list of rendered shapes may be tailored to the type of video game being played. For example, the list may include oil slicks, speed bumps, and different tire types for a car racing game. Typically, the imagination of the video game designer and the available memory space of the video game system are the only limits to the number and types of rendered shapes available to the video game user.

In the event that the drawn shape does not match or is not similar to a shape in the list of rendered shapes, the video game may disregard the drawn shape or present the user with a message that the shape does not match one of the rendered shapes in the rendered shapes list.

Figure 10B:
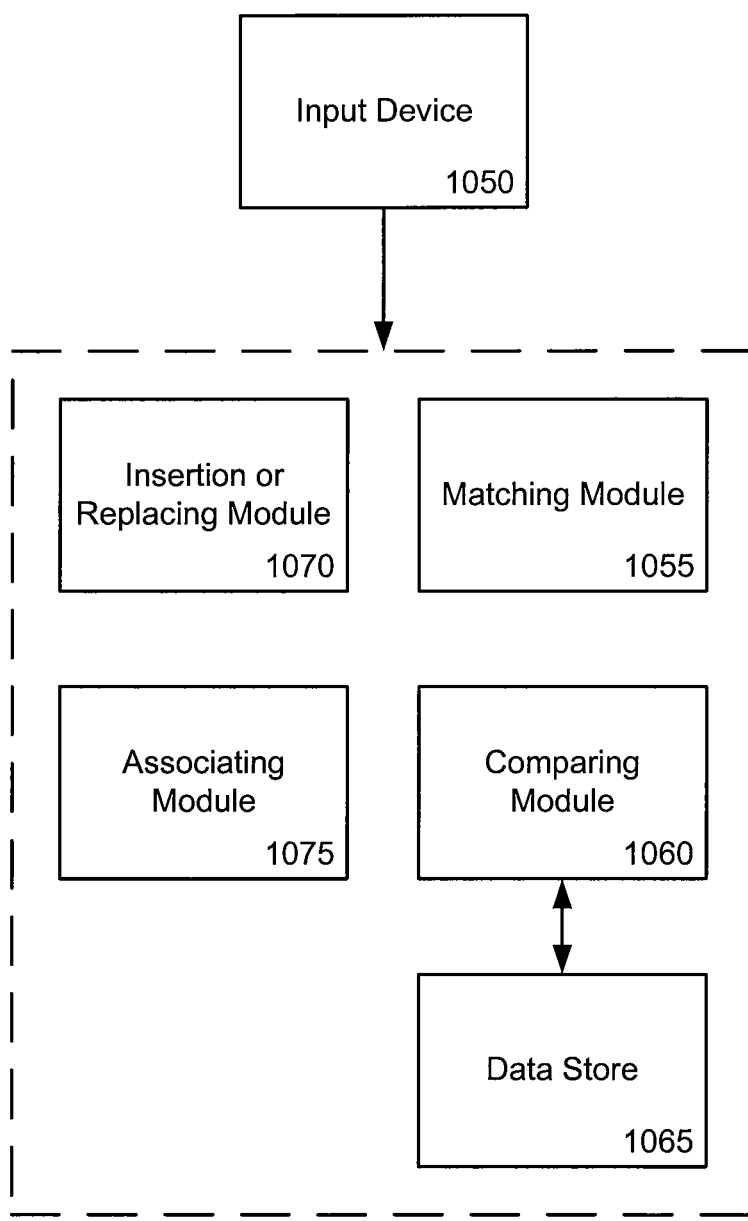
FIG. 10b is a block diagram of a system that provides for a video game to recognize a shape drawn within the video game environment, replace the drawn shape with a rendered shape, and allow interaction with the rendered shape.

FIG. 10*b* is a block diagram of a system that provides for a video game to recognize a shape drawn within the video game environment, replace the drawn shape with a rendered shape, and allow interaction with the rendered shape. The system may include an input device 1050. The input device 1050 may be any type of video game controller that allows the user to provide an input to the video game system. Some examples given above include a mouse device or a directional pad. Other types of input devices 1050 are described in more detail below with reference to FIGS. 11-16

The system of FIG. 10*b* may also include a collection of modules. These modules may be included in a video game system including a processor. The processor of the video game system may be configured to perform the methods of each module of the system as described in more detail below. Alternatively, a computer readable medium may be configured to perform the methods of each module of the system.

Such computer-readable media can be any available media that can be accessed by a general purpose or special purpose computer. By way of example, and not limitation, such computer-readable media can comprise RAM, ROM, EEPROM, DVD, CD ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications link or connection (either hardwired, wireless, or a combination of hardwired or wireless) to a computer, the source of the information can be properly viewed as a computer-readable medium, such as a server, a storage medium, a processor, and the like.

Combinations of the above should also be included within the scope of computer-readable media. Computer-executable instructions comprise, for example, instructions and data which cause a general purpose computer, special purpose computer, or special purpose processing device to perform a certain function or group of functions.

The system of FIG. 10*b* may include a matching module 1055 configured to match a drawn shape within the video game environment against a list of possible rendered shapes to find a rendered shape that matches with the drawn shape. The matching module 1055 may utilize a comparing module 1060 that compares a collection of data points along the drawn shape to a collection of data points for each rendered shape in the list. A data store 1065 may also be included in the system to store the list of possible rendered shapes. The comparing module 1060 may access the data store 1065 to compare the drawn shape to the list of possible rendered shapes to provide a rendered match to the drawn shape. Each rendered shape in the list of possible rendered shapes may contain a collection of points that define the rendered shape. For example, a user may draw a circle in the video game environment. The code may recognize the circle shape by comparing several points along the drawn shape. These points may be compared to the collection of points of each rendered shape in the list stored in the data store. The code may then recognize that the points of the drawn circle match or closely approximate the collection of points for a rendered hole. Thus, the video game may recognize that the user has drawn a hole in the ground of the video game environment.

If the drawn shape matches or is similar to one of the rendered shapes included in the list of rendered shapes, a insertion or replacing module 1070 may insert the rendered shape in the video game environment. The insertion module or replacing module 1070 may insert the rendered shape into the environment or may replace the drawn shape with the rendered shape. In the event that the drawn shape does not match or is not similar to a shape in the list of rendered shapes, the insertion or replacing module 1070 may disregard the drawn shape or present the user with a message that the shape does not match one of the rendered shapes in the rendered shapes list.

If the rendered shape is inserted into the video game environment or replaces the drawn shape, an associating module 1075 may be configured to associate the rendered shape with the background of the video game environment. Once associated with the background, the characters of the video game may interact with the newly rendered shape. In a similar manner, the associating module 1075 may associate the rendered shape with a character of the video game. Upon association with the character, the characters of the video game may interact with the rendered shape. Thus, through the described system, a user of a video game may draw a shape within the video game environment, the drawn shape may be replaced with a rendered shape and the video game and video game characters may interact with the rendered shape.

Described above are several methods for allowing a user of a video game to alter game scenes, objects and models in real-time by drawing shapes within the video game environment during game play. The user of the video game system may draw a shape within the video game environment by manipulating a video game controller. Some examples of controllers that the user may use to draw within the video game environment include a mouse device or a directional pad. Another example of a controller that may be used to draw a shape within a video game is a tablet-type controller. Several embodiments of a tablet-type video game controller are described below.

Figure 11:
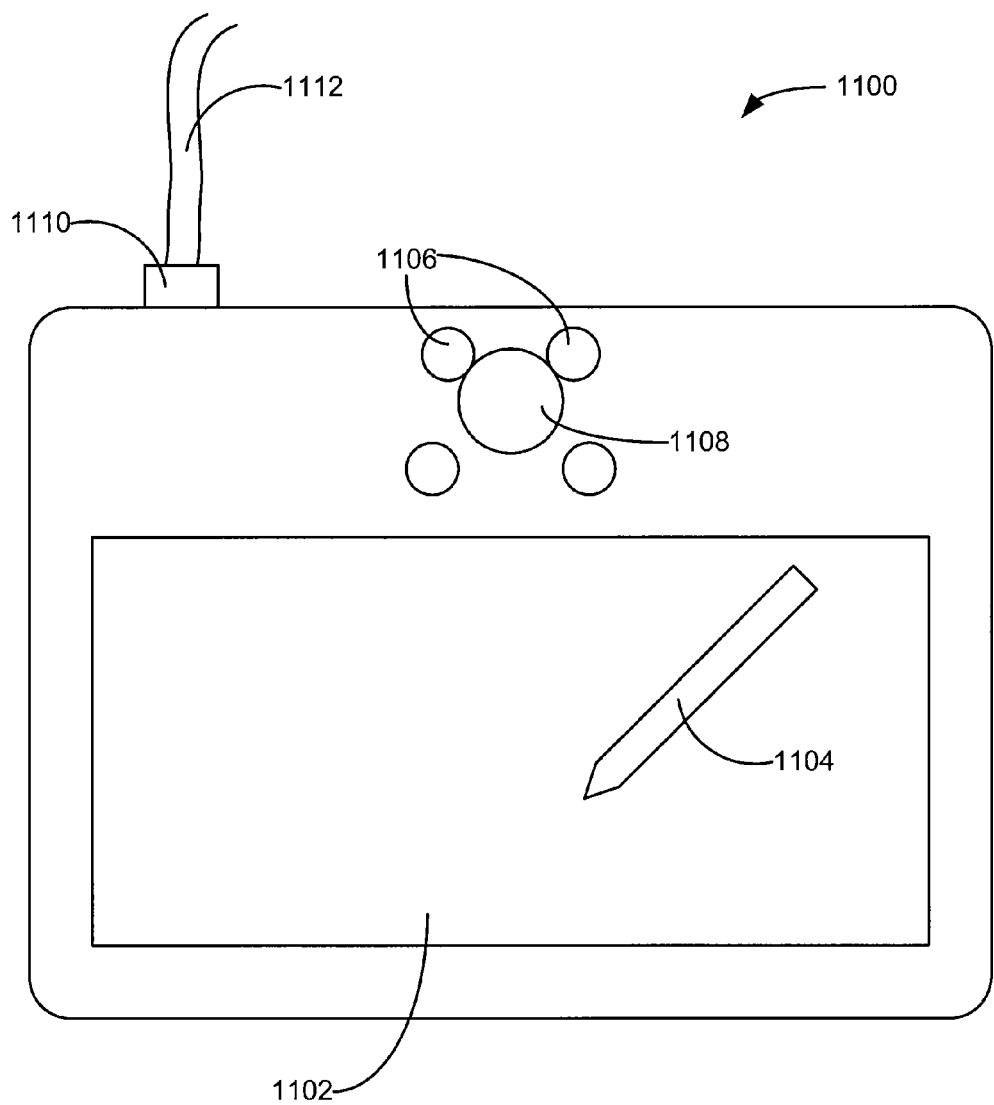
FIG. 11 is a top view of a first embodiment of a video game controller utilizing multiple input devices.

FIG. 11 is a top view of a first embodiment of a video game controller utilizing multiple input devices. The controller 1100 may allow a user or player of a video game system to provide multiple inputs to the video game system to control the various characters and features of the video game.

The controller 1100 depicted in FIG. 11 may be rectangular in shape and constructed from a molded plastic. The controller 1100 may also be large enough to be held with two hands of a video game player. While the controller 1100 depicted is rectangular in shape, the controller 1100 may take any shape suitable for video game use. Also, the controller 1100 may vary in size depending on the capabilities of the various video game systems the controller 1100 may be used with. The controller 1100 may also be molded on the bottom to form fit into the lap of a video game user. Further, the controller 1100 may include handles molded into the sides of the controller for ease in moving and tilting the controller 1100.

The controller 1100 may include a flat surface, or tablet 1102, on the top of the controller 1100. The tablet 1102 may be used by the user to provide pressure inputs to the controller 1100 by drawing in the tablet 1102 area. For example, as explained in more detail below, the user may draw along the tablet 1102 with a stylus device. The controller 1100 may be capable of detecting the pressure applied by the user at multiple points upon the tablet 1102 area as the stylus is moved across the tablet 1102. Thus, the user may supply a pressure input to the controller 1100 through the tablet 1102. Although the tablet 1102 is rectangular-shaped as depicted in FIG. 11, the tablet 1102 may be any shape. Further, the tablet 1102 may encompass the entire surface of the controller, or may be limited to a particular area of the controller. Accordingly, a "tablet" as used herein, encompasses any area of the controller that may recognize and interpret pressure applied to the area.

As discussed above, the pressure may be applied to the tablet 1102 through a specifically manufactured device or stylus 1104. The pressure may also be provided by the fingers or hands of the video game system user. Although the stylus 1104 is pen-shaped as depicted in FIG. 11, the stylus 1104 may be any shape and size. Thus, a stylus may be any manufactured device that may be used to apply pressure to the tablet 1102 such that the controller 1100 may recognize and register the pressure input.

The controller 1100 may register the location of the pressure being applied on the tablet 1102 and provide an X/Y coordinate of the pressure point to the video game system. The controller 1100 may also provide a value to the video game system indicating the amount of pressure applied by the user. Thus, through the tablet 1102 input, the controller 1100 may then recognize and react to varying degrees of pressure from the stylus 1104 or hands of the user across multiple points in the tablet 1102 area. These inputs may then be applied to a video game such that the user may interact with the video game by drawing or pressing on the tablet 1102 area of the controller 1100. The interaction between the pressure inputs provided by the user and the video game system is described in more detail below with respect to FIG. 13.

The controller 1100 may also include a set of buttons 1106 that may be pressed by the user during gameplay to further interact with the video game. The controller 1100 may include any number of buttons 1106 that may be located anywhere on the controller 1100. A user of the controller 1100 may press the buttons 1106 during gameplay to interact with the video game. For example, one button may function as an "undo" feature, while a second button may function as a "save" feature. Further, the same button may perform separate functions based on the video game being played. For example, a button may cause a character of the video game to jump in a role-playing game while the same button may accelerate a racecar in a driving simulation game. The function of each button 1106 included on the controller 1100 may be configured by the video game designer to interact with the particular video game being designed.

The buttons of the controller 1100 may also function as a directional pad or scrolling device. For example, button 1108 may be a four-direction control pad with a button at each of the four points. Thus, a user of the controller 1100 may press the directional pad to move a character of a video game. Alternatively, button 1108 may spin allowing the user to scroll through a list of possible game actions. In another embodiment, button 1108 may contain a hole in the center of the button. A user of the controller 1100 may insert the stylus 1104 or other device into the hole of the button 1108 to create a joystick-type device. The stylus 1104 or other device may then by manipulated by the user to control the video game. Through these configurations, the buttons (1106, 1108) of the controller 1100 may provide to the user of the video game system a variety of input interfaces.

The controller 1100 may also include a cable 1112 to transmit and receive electronic signals to and from the video game console. The cable 1112 may be wired directly to the controller 1100 or may connect to the controller 1100 through an I/O port 1110. The I/O port 1110 of the controller 1100 may be any device or construct capable of receiving electrical signals from a cable 1112. Exemplary I/O ports include USB ports, RCA-type ports, VGA ports, DB25 ports, S-Video ports, SDI ports, BNC ports and so on. An alternative embodiment may transmit electronic signals from the controller 1100 to the video game console wirelessly. Thus, the controller 1100 may include an RF-device to broadcast and receive electronic signals to and from a video game console. Through the I/O port 1110, the cable 1112, or the wireless device, the controller 1100 may transmit electronic signals representing the inputs provided by the video game user through the controller 1100 to a video game console such that the user may interact with a video game.

Figure 12:
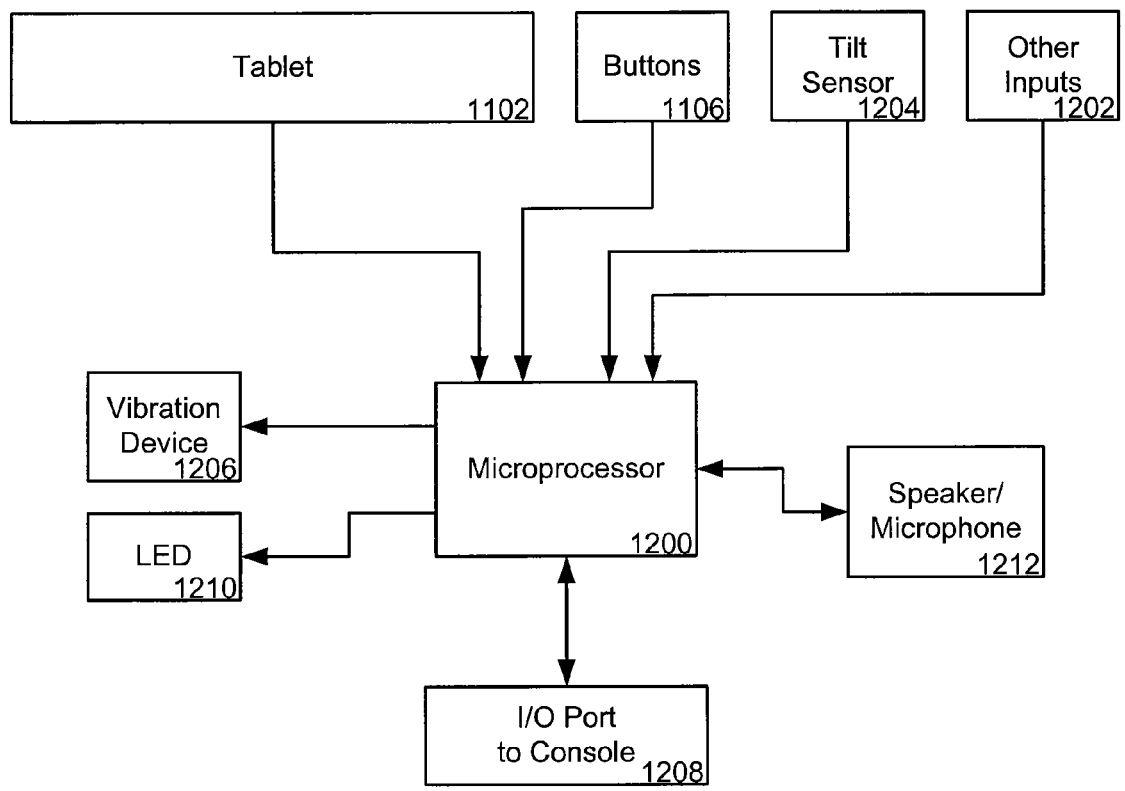
FIG. 12 is block diagram illustrating the components of a first embodiment of a video game controller utilizing multiple input devices.

FIG. 12 is block diagram illustrating the components of a first embodiment of a video game controller utilizing multiple input devices. While FIG. 12 illustrates some of the components of the controller, it should be appreciated that other embodiments may omit some components or may add additional components.

The embodiment depicted in FIG. 12 may include a microprocessor 1200. The microprocessor 1200 may receive electrical signals from the multiple inputs of the controller, as well as communicate those inputs to a video game console for interpretation by the video game system. Further, the microprocessor 1200 may provide output signals to control various output devices of the controller.

As discussed above with reference to FIG. 11, the controller may include several input devices through which a video game user may interact with the video game system. These inputs may include a tablet 1102 that may interpret pressure applied to the tablet 1102 by the user and a series of buttons 1106 that may be pressed by the user. The tablet 1102 and buttons 1106 are also represented in FIG. 12 as inputs to the microprocessor 1200. Other inputs 1202 may also be included in the controller as inputs to the microprocessor 1200. For example, the controller may include a track-wheel device, such as found in a mouse controller for a personal computer. The controller may also include a series of knobs or switches accessible by the user. The other input devices 1202 may also include peripheral devices that may plug into the controller. For example, a standard mouse device may plug into the controller for use by the user. Similarly, a set of drum sticks may also plug into the controller for use during a drumming game, or a steering wheel for use during a driving simulator. It should be appreciated that the embodiment is not limited to the above examples of possible input devices. Accordingly, "input devices" as used herein, encompasses all such devices that allow a user to interact with the controller and to provide and/or receive an input to the video game system.

The controller of FIG. 12 may also include an internal tilt sensor 1204 that may communicate the orientation and acceleration of the controller in three-dimensional space as an input to the microprocessor 1200. The tilt sensor 1204 may include a series of accelerometers located within the controller that measure the movement, acceleration and orientation of the controller. The accelerometers may then provide the measurements to the microprocessor 1200 of the controller, which may in turn transmit those measurements to the video game console through a series of electronic signals. For example, the tilt sensor 1204 may recognize when the user tilts the controller from front to back. The tilt sensor 1204 may measure the motions of the controller and provide those signals to the video game console. Through this, the user of the video game system may tilt, turn, or shake the controller to interact with a video game.

The microprocessor 1200 may also provide an output signal to various output devices associated with the controller. For example, the microprocessor 1200 may transmit an electrical signal to a vibration device 1206 located within the controller. The vibration device 1206 may cause the controller to vibrate to provide a more interactive experience for the video game user. For example, the microprocessor 1200 may send a signal to the vibration device during specific game events, such as a when a car crashes into a wall in the video game. Thus, the user may feel the controller vibrate when the car hits the wall in the game. A signal to vibrate the controller may be received by the microprocessor 1200 from the video game console through the I/O port 1208, as described in more detail below.

The microprocessor may also provide an output signal to an LED display 1210 located on the video game console or the controller itself. The LED display 1210 may communicate to the video game user a status of the video game system. For example, the microprocessor 1200 may send a signal to the LED display 1210 to indicate to the user that the controller is effectively communicating with the video game console. It should be appreciated that the embodiment of FIG. 12 is not limited to the above examples of possible output devices that may receive a signal from the microprocessor.

Other components of the controller may both provide an input to the microprocessor 1200 as well as receive an output from the microprocessor 1200. For example, the controller may include a speaker/microphone device 1212. The speaker portion of the speaker/microphone device 1212 may allow the user to input sound into the controller. The microprocessor 1200 may then convert the inputted sound into electronic signals to send to the video game console such that the user may utilize the microphone to interact with a video game or with other users in the case of a video game played over a network. The microprocessor 1200 may also transmit signals received from the video game console to the speaker portion of the speaker/microphone device 1212 to provide the user with a more interactive gaming experience.

As described above, the microprocessor 1200 may communicate with a video game console of a video game system through an I/O port 1208 located on the controller. Through the I/O port 1208, the controller may transmit the various input signals provided by the user through the input devices to the video game console. The video game console may then interpret the input signals and change the video game environment in response to the inputs. For example, a user may press a button on the controller and a character of the video game may jump. Similarly, the microprocessor 1200 may receive signals from the video game console through the I/O port 1208 of the controller. For example, the video game may include instructions to vibrate the controller whenever a character is runs into an object. The video game console may then transmit a signal to the controller through the I/O port 1208. The microprocessor 1200 may receive the transmitted signal and send it onto the vibration device to initiate vibration of the controller. Thus, the microprocessor 1200 of the controller may both transmit and receive electronic signals from the video game console through the I/O port 1208.

Figure 13:
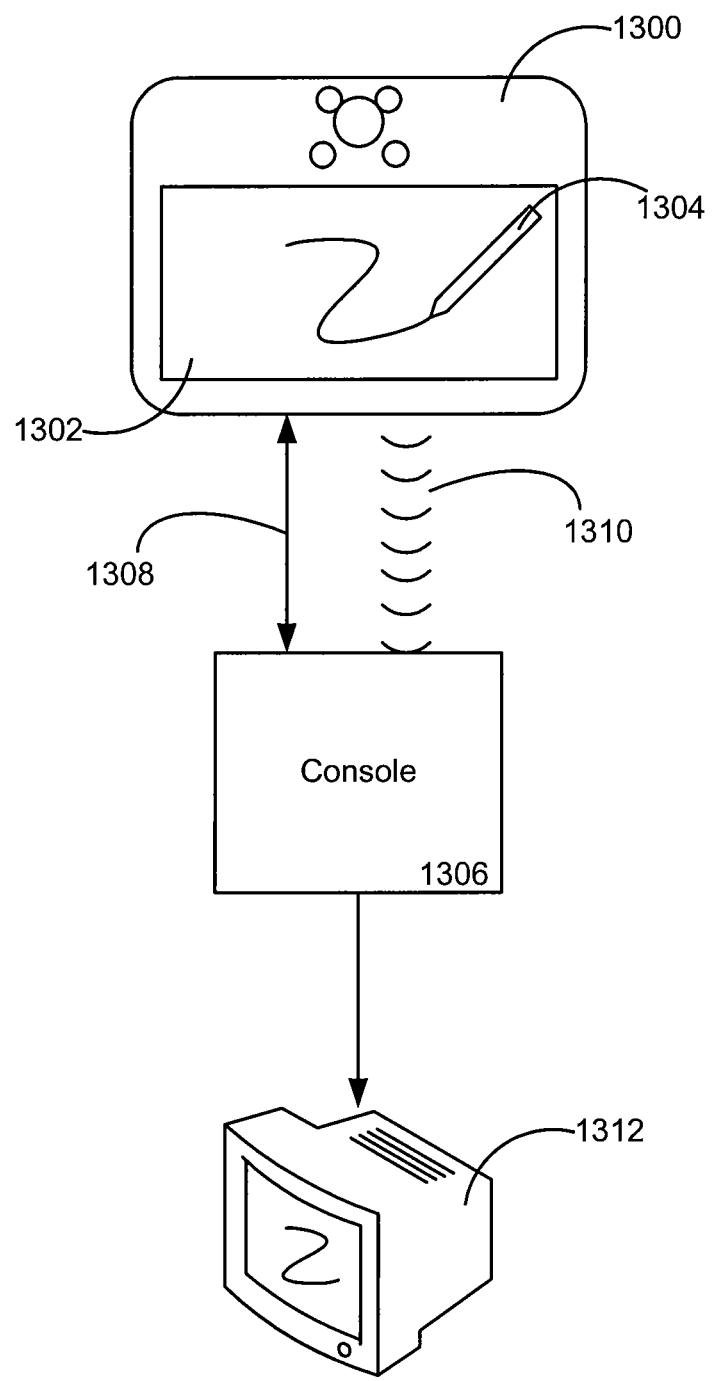
FIG. 13 is a block diagram illustrating the capability of a first embodiment of a video game controller to translate a shape drawn on the tablet device into a video game environment.

FIG. 13 is a block diagram illustrating the capability of a first embodiment of a video game controller to translate a shape drawn on the tablet device into a video game environment. As described above, the user of a video game may use a controller 1300 to provide inputs to a video game system to control the action of a video game. The controller may include a tablet 1302 and stylus 13013 to provide the user with the capability to draw a shape or otherwise provide a pressure input to tablet 1302 to communicate with the video game system.

As mentioned above, a video game user may provide inputs to a video game system through the controller by drawing a shape within the tablet 1302 area. For example, the user may use a stylus device 1304 to draw a shape on the tablet 1302 area. The controller 1300 may register each location of the pressures being applied on the tablet 1302 and provide a map of the X/Y coordinates of the pressure points to the video game system as the user applies the pressure to the tablet 1302. The controller 1300 may also provide a value to the video game system indicating the amount of pressure applied at each point. The controller 1300 may then transmit the information received through the tablet 1302 to a video game console 1306 to allow the user to interact with a video game. The transmission of the coordinates and pressure value may take place through a cable 1308 connected between the controller 1300 and a console 1306. Alternatively, the controller 1300 may broadcast the signals to the console 1306 through a wireless connection 1310.

The console 1306 may receive the transmitted signals from the controller 1300 and interpret the signals to interact with the video game being displayed. The console 1306 may then send the incorporate the input signals into a video game environment and display the video game on a display device 1312. As shown in FIG. 13, the video game system may take the input shape drawn by the video game user on the tablet 1302 and display the same shape on the video game display device 1312, allowing the user of the video game system to interact with a video game. This interaction may be used when the video game includes a drawing or handwriting exercise.

While FIG. 13 illustrates the reproduction on the display device 1312 of the shape drawn on the tablet 1302, it is not necessary that the shape drawn on the tablet 1302 be reproduced. The tablet 1302 input may also allow the user to alter the characters of a video game or the video game environment as described above. For example, the user may use the stylus 1304 to draw on the tablet 1302 to select a point on a character of the video game. The user may then move the stylus 1304 across the tablet 1302. The console 1306 may receive the input of the stylus 1304 moving across the tablet 1302 and interpret the movement as a movement of the character. Thus, the video game console 1306 may then move the character in the direction of the stylus 1304 movement in response to the user's input on the tablet 1302. The user may also increase the size of the video game character by selecting the character and expanding the character through the movement of the stylus 1304.

The user of a video game system may also use his fingers or hands to apply pressure to the tablet 1302 as an input to the video game system. The controller 1300 may interpret the pressure applied by the user's fingers in the same manner as if the user were using the stylus 1304. Thus, the user may use their finger to draw a shape that may be reproduced on the display device 1312. Further, the user may use multiple fingers at once to move objects within a video game. For example, the user may use a forefinger and a thumb simultaneously to open a door within a video game. By moving the thumb and forefinger apart while pressing on the tablet 1302, the video game console 1306 may interpret the movement as a desire to open a door within the video game. Similarly, the user may perform the same movements with his fingers to expand the size of a character. Typically, the imagination of the video game designer and the available memory space of the video game system are the only limits to the number and types of movements the video game system may recognize through the tablet 1302 of the controller 1300.

The user may also use the stylus 1304 or the user's fingers to tap within the tablet 1302 area. The tapping within the tablet 1302 area may be interpreted by the video game console 1306 in a similar manner as described above when drawing on the tablet 1302. For example, the controller 1300 may detect the tap on the tablet 1302 area, provide an X/Y coordinate for the tap, and provide a value indicating the amount of pressure applied during the tap. The user may utilize the tapping input to select an object within the video game environment. Alternatively, the tapping may be interpreted as an action input by the console 1306. For example, the user may tap on the tablet 1302 to select a rock for the video game character to pick up. The user may then tap a second time to make the character throw the rock. Typically, the imagination of the video game designer is the only limit to the types of movements within the video game that may correlate to the user tapping on tablet 1302.

As explained above with reference to FIG. 12, the controller 1300 may also include a tilt sensor. The tilt sensor may be utilized by the user of the controller 1300 to interact with a video game. For example, the user may tip the controller 1300 forward to accelerate or tip the controller backward to slow a car within a racing simulator. Similarly, the user may tip the controller from side to side to steer the car. The tilt sensor of the controller 1300 may recognize the movements, acceleration and orientation of the controller 1300. The controller 1300 may then send electrical signals to the console 1306 indicating the changes in movement of the controller 1300. The console 1306 may interpret the received signals and incorporate those signals into the video game being displayed. Thus, the video game user may use the tilt sensor within the controller 1300 to control the action of the video game. Again, the only limit to the types of tilt sensor movements that correspond as an input to a video game is the imagination of the video game designer.

Figure 14:
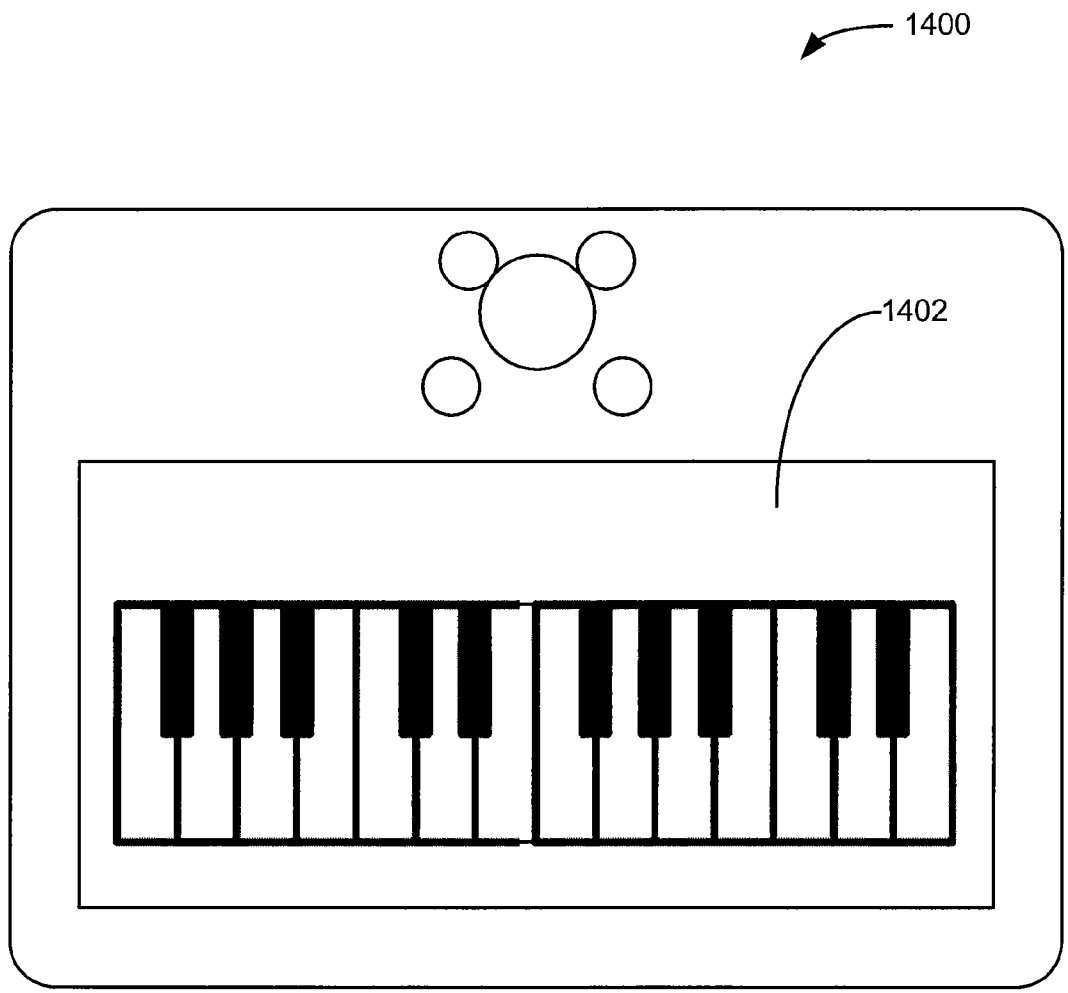
FIG. 14 is a top view of a second embodiment of a video game controller illustrating a piano overlay covering a tablet area of the video game controller.

FIG. 14 is a top view of a second embodiment of a video game controller illustrating a piano overlay covering a tablet area of the video game controller. The controller 1400 illustrated in FIG. 14 is similar to the embodiment depicted in FIG. 11. However, this embodiment may include a overlay 1402 that covers the controller 1400 such that the user of the controller may interact with a particular video game that corresponds to the overlay 1402 device.

As described in FIG. 11, a video game controller 1100 may include a tablet 1102 that may detect pressure at multiple points along the tablet 1102 surface. This pressure may be applied by a stylus 1104 device or by the user's fingers or hands. The user may use the tablet 1102 to interact with a video game by providing inputs through the tablet 1102. To further assist the user's interaction with the video game, a overlay may be provided that covers the tablet 1102 area and provides the user with an interface for using the tablet 1102 on the controller 1100.

In FIG. 14, a overlay 1402 depicting piano keys may cover the tablet area of the controller 1400. Such an overlay 1402 may be used for a video game requiring the user to play a piano, either as a learning device or as part of a puzzle solving game. Once the overlay 1402 is in place over the tablet area, the user may then use a stylus or their fingers to press on the appropriate keys of the overlay 1402. In this manner, the overlay 1402 may provide the user of the controller 1400 an interface to properly interact with the video game. The tablet may detect the pressure applied by the user to the overlay 1402 and interpret the signals accordingly. For example, the controller 1400 may detect a pressure point on the tablet directly under the A key of the piano overlay 1402. Thus, the controller 1400 and the video game console may interpret the pressure point as the user pressing the A key. The video game may then depress the A key in a video game and make the sound of the A key of a piano being pressed. Without the overlay 1402 in place, the user may find it difficult to determine which area of the tablet corresponds to which key of the piano. Thus, the overlay 1402 provides an interface to the video game user such that the user may use the tablet and controller 1400 to interact with a video game.

The overlay 1402 may be composed of various materials. For example, the overlay 1402 may be composed of a clear, reusable plastic with the piano keys painted or pressed onto the plastic. Generally, the overlay may be composed of any material that allows the overlay to cover the tablet area of the controller 1400 and allows the transfer of the pressure applied by the user on top of the overlay 1402 through the overlay 1402 and onto the tablet, such that the tablet detects the pressure being applied by the user.

Further, the overlay 1402 may attach the controller 1400 in many varied ways. For example, the overlay 1402 may include a sticky substance on the bottom so that the overlay may attach to the tablet area of the controller 1400. Similarly, the overlay 1402 may be composed of such a material that it may stick to the controller 1400 through static electricity. The overlay 1402 may also connect to the controller 1400 by attaching to the sides or by sliding a sleeve including the overlay 1402 around the controller 1400. It should be noted that the method by which the overlay 1402 attaches to the controller 1400 is not limited to the above examples. Any method to attach the overlay 1402 to the controller 1400 such that the overlay 1402 covers the tablet area of the controller 1400 is imagined without taking away from the spirit and scope of the invention.

Figure 15:
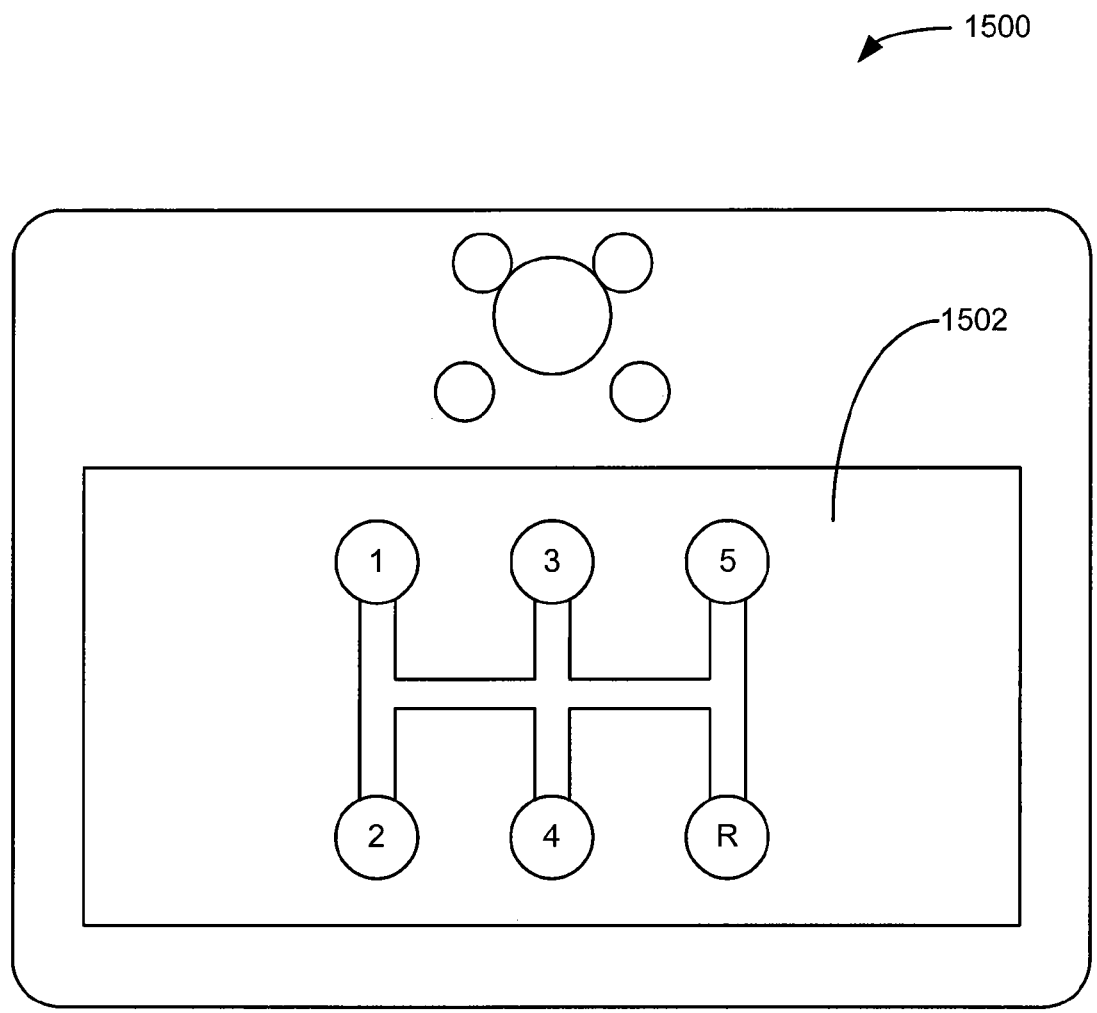
FIG. 15 is a top view of a third embodiment of a video game controller illustrating a racing game interface overlay covering a tablet area of the video game controller.

The various types of overlays that may provide an interface to a video game is only limited by the imagination of the video game designer. For example, FIG. 15 is a top view of a third embodiment of a video game controller illustrating a racing game interface overlay covering a tablet area of the video game controller. The racing overlay 1502 may include a depiction of a gear shift. During game play of a driving or racing simulator, the user may use a stylus device or his fingers to press on the numbered circles within the overlay 1502. The numbered circles may correspond to a gear for the racecar depicted in the video game. Thus, by pressing on the numbered circles, the user may change the gears of the racecar within the video game. The controller 1500 may detect pressure applied to the area under the numbered circles and change the gear of the racecar of the video game to correspond to the area pressed. In this manner, the racing overlay 1502 may provide an interface for a user of a racing video game.

Further examples of overlays include an overlay depicting a keyboard that may be utilized by the user to use the controller for typing a message. Also, the overlay may include a stencil that a user may utilize to draw shapes within the video game.

Figure 16:
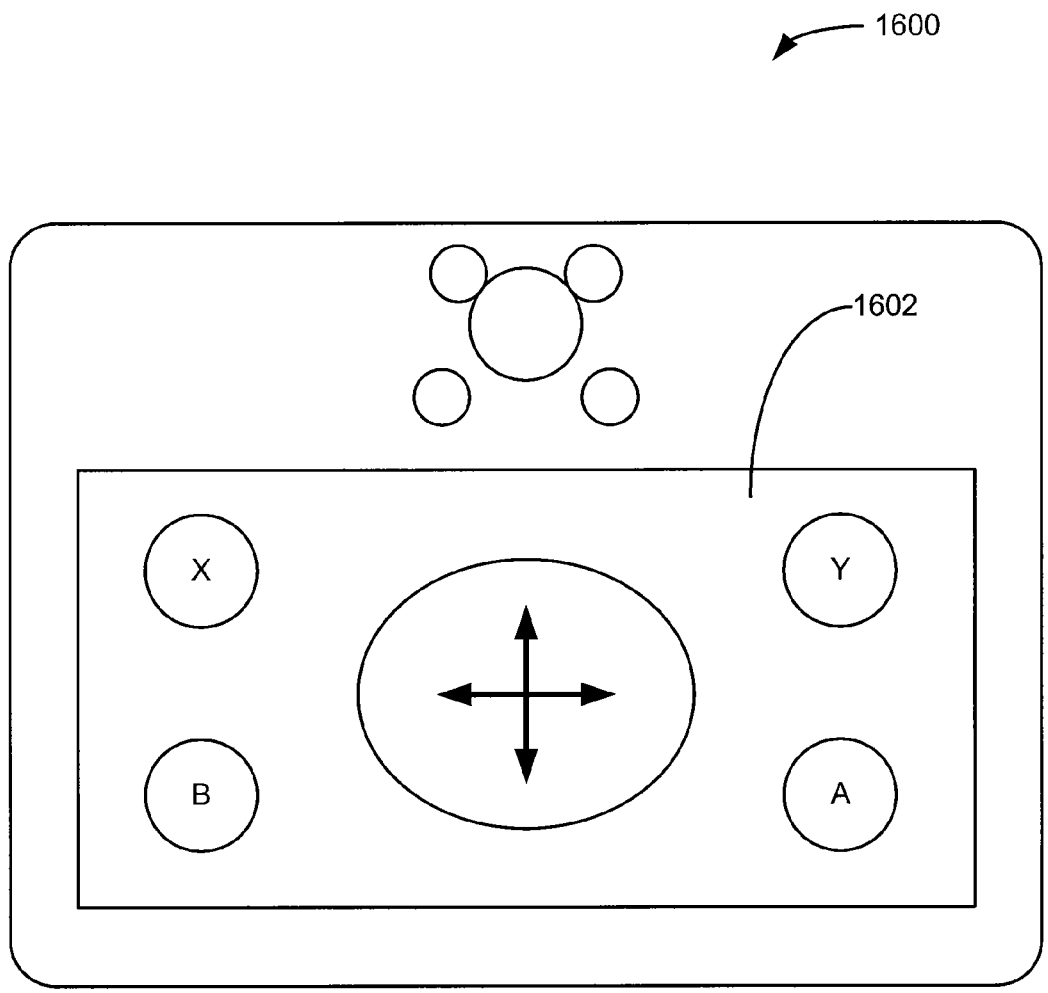
FIG. 16 is a top view of a fourth embodiment of a video game controller illustrating a overlay covering a tablet area of the video game controller that allows the embodiment to be used with a pre-existing video game console.

Another example of an overlay is depicted in FIG. 16. FIG. 16 is a top view of a fourth embodiment of a video game controller illustrating a overlay covering a tablet area of the video game controller that allows the embodiment to be used with a pre-existing video game console. In this embodiment, the overlay 1602 provides an interface to the user that closely resembles a video game controller for a pre-existing video game system. For example, a pre-existing video game system may include a controller with four buttons (A, B, X and Y) and a directional pad. The controller 1600 depicted in FIG. 16 may also be used with the pre-existing video game system in place of the controllers that are part of the game system. The overlay 1602 depicted may assist in the user of the video game system to utilize the controller 1600 to provide inputs to the video game system. The user may use an overlay 1602 that includes four buttons, labeled A, B, X and Y, and a directional pad. Like the examples above, the user may use a stylus device or fingers to press the overlay in the appropriate area. For example, if the user wishes to press the X button, the user may use a stylus or his fingers to press the circle marked X on the overlay 1602. The controller 1600 may detect the pressure applied to the tablet under the X button of the overlay 1602 and interpret the pressure as if the user pressed the X-button on the standard controller. In this manner, the overlay 1602 may assist the user in interfacing the controller 1600 with a pre-existing video game system, effectively replacing the controller that was included with the pre-existing system with the embodied controller 1600. Thus, the controller 1600 may be used with any video game system by utilizing the correct overlay to cover the tablet area of the controller 1600.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustrations only and are not intended to limit the scope of the present invention. References to details of particular embodiments are not intended to limit the scope of the invention.

What is claimed is:

1. A video game controller for playing a video game having a game environment in display, the video game controller comprising:
    a tablet pad including a surface that detects pressure applied to the tablet pad by a user;
    a stylus configured to be used by the user to provide pressure to the tablet pad and alter the game environment by drawing shapes directly in the game environment, wherein the video game replaces the shapes in the game environment with a computer-rendered shape in the game environment;
    at least one accelerometer configured to measure the movement and orientation of the video game controller;
    a microprocessor in communication with the tablet pad and the at least one accelerometer, the microprocessor configured to associate a coordinate value to the pressure applied to the tablet pad by the user;
    a port in communication with the microprocessor, the port configured to communicate with a video game system, wherein the microprocessor transmits the coordinate value to the video game system through the port for altering the game environment by drawing the shapes within the game environment of the video game.

2. The video game controller of claim 1, wherein the user provides multiple pressure inputs to the tablet pad by drawing on the tablet pad with the stylus.

3. The video game controller of claim 1, wherein the user provides pressure to the tablet pad by pressing on the tablet pad with the user's finger.

4. The video game controller of claim 1, wherein the microprocessor associates a value indicating the amount of pressure applied to the tablet pad by the user.

5. The video game controller of claim 1, further comprising: at least one button configured to provide an input to the video game system when pressed.

6. The video game controller of claim 1, wherein the port further comprises: a wireless device to communicate with the video game system.

7. The video game controller of claim 1, further comprising:
    a peripheral input interface configured to communicate with a peripheral input device, wherein the peripheral input device is selected from a group comprising: a mouse, a trackwheel, a microphone and a steering wheel.

8. The video game controller of claim 1, wherein at least one character interacts with the computer-rendered shape.

9. A video game controller for playing a video game having a game environment in display, the video game controller comprising:
    a tablet pad including a surface that detects pressure applied to the tablet pad by a user;
    a stylus configured to be used by the user to provide pressure to the tablet pad and alter the game environment by drawing shapes directly in the game environment, wherein the video game replaces the shapes in the name environment with a computer-rendered shape in the game environment;

a microprocessor in communication with the tablet pad, the microprocessor configured to associate a coordinate value to the pressure applied to the tablet pad by the user;

a port in communication with the microprocessor, the port configured to communicate with a video game system, wherein the microprocessor transmits the coordinate value to the video game system through the port for altering the game environment by drawing the shapes within the game environment of the video game; and an overlay positioned at least partially on the surface, wherein the overlay indicates to the user where to apply pressure to the tablet pad to interact with the video game.

10. The video game controller of claim 9, wherein the overlay is a stencil.

11. The video game controller of claim 9, wherein the overlay provides an interface for the video game controller to be used with a pre-existing video game system.

12. The video game controller of claim 9, wherein the stylus can be used by the user to apply pressure to the overlay.

13. The video game controller of claim 9, wherein the user provides pressure to the overlay by pressing on the tablet pad with the user's finger.

14. The video game controller of claim 9, wherein the microprocessor associates a value indicating the amount of pressure applied to the tablet pad by the user.

15. The video game controller of claim 9, further comprising: at least one button configured to provide an input to the video game system when pressed.

16. The video game controller of claim 9, further comprising: a tilt sensor configured to measure the movement and orientation of the video game controller.

17. The video game controller of claim 9, wherein the port further comprises: a wireless device to communicate with the video game system.

18. The video game controller of claim 9, further comprising: a peripheral input interface configured to communicate with a peripheral input device, wherein the peripheral input device is selected from a group comprising: a mouse, a trackwheel, a microphone and a steering wheel.

19. The video game controller of claim 9, wherein at least one character interacts with the computer-rendered shape.

\* \* \* \* \*

UNITED STATES PATENT AND TRADEMARK OFFICE
CERTIFICATE OF CORRECTION

| | | |
|---|---|---|
| PATENT NO. | : 8,727,878 B2 | Page 1 of 1 |
| APPLICATION NO. | : 12/176192 | |
| DATED | : May 20, 2014 | |
| INVENTOR(S) | : Holly G. Longdale | |

It is certified that error appears in the above-identified patent and that said Letters Patent is hereby corrected as shown below:

In the claims,

Column 21, line 1, "shapes in the name" should be changed to --shapes in the game--.

Signed and Sealed this
Eleventh Day of November, 2014

Michelle K. Lee
*Deputy Director of the United States Patent and Trademark Office*